(12) United States Patent
Serell

(10) Patent No.: US 8,875,915 B2
(45) Date of Patent: Nov. 4, 2014

(54) CONTAINER HAVING A PROGRAMMABLE COMBINATION LOCKING CAP

(75) Inventor: Sean Serell, Fort Collins, CO (US)

(73) Assignee: Secure Medication Systems, LLC, Fort Collins, CO (US)

(*) Notice: Subject to any disclaimer, the term of this patent is extended or adjusted under 35 U.S.C. 154(b) by 251 days.

(21) Appl. No.: 13/611,057

(22) Filed: Sep. 12, 2012

(65) Prior Publication Data
US 2013/0062303 A1 Mar. 14, 2013

Related U.S. Application Data

(60) Provisional application No. 61/533,691, filed on Sep. 12, 2011.

(51) Int. Cl.
| | |
|---|---|
| A61J 1/00 | (2006.01) |
| B23P 11/00 | (2006.01) |
| A61J 1/03 | (2006.01) |
| B65D 55/02 | (2006.01) |
| A61J 1/14 | (2006.01) |

(52) U.S. Cl.
CPC .. A61J 1/03 (2013.01); B23P 11/00 (2013.01); A61J 1/1437 (2013.01); B65D 55/02 (2013.01)
USPC ............... 215/206; 220/254.1; 220/256.1; 70/63; 70/167; 70/315

(58) Field of Classification Search
CPC ......... B65D 55/02; A61J 1/1437; B23P 11/00
USPC ............... 220/210, 212, 254.1, 254, 256.1; 215/206, 207, 208, 201; 206/580, 1.5; 70/58, 63, 158, 163, 165–167, 232, 70/312, 314, 315
See application file for complete search history.

(56) References Cited

U.S. PATENT DOCUMENTS

| | | | | |
|---|---|---|---|---|
| 3,313,441 A | * | 4/1967 | Fadden | 215/206 |
| 3,421,347 A | | 1/1969 | Sotory | |
| 3,684,117 A | | 8/1972 | Leopoldi et al. | |
| 3,782,577 A | | 1/1974 | Levey | |
| 3,828,519 A | | 8/1974 | Levey | |
| 3,843,007 A | * | 10/1974 | Meyer | 215/206 |
| 4,354,365 A | | 10/1982 | Mayer et al. | |
| 4,445,348 A | | 5/1984 | Saitoh | |
| 4,615,191 A | | 10/1986 | Grandy | |
| 4,782,963 A | * | 11/1988 | Hunter | 215/206 |
| 5,213,223 A | | 5/1993 | Minnette | |
| 5,277,325 A | | 1/1994 | Yan | |
| 5,284,262 A | | 2/1994 | O'Nan | |
| 6,059,132 A | | 5/2000 | Benjamin | |
| 7,252,204 B1 | | 8/2007 | Small | |
| 2002/0179561 A1 | * | 12/2002 | Peck et al. | 215/204 |
| 2011/0174758 A1 | * | 7/2011 | Gonzalez Sanchez et al. | 215/206 |
| 2011/0239715 A1 | * | 10/2011 | Weiershausen | 70/315 |

* cited by examiner

Primary Examiner — Robert J Hicks
Assistant Examiner — Kareen Rush
(74) Attorney, Agent, or Firm — William W. Cochran; Cochran Freund & Young LLC

(57) ABSTRACT

Disclosed is a bottle having a programmable combination locking cap. The locking cap has an upper cap, which locks onto a canister. The locking cap has various layers of rings so that the rings can be aligned in a combination code in order to remove the locked cap from the canister.

16 Claims, 30 Drawing Sheets

CONTAINER HAVING A PROGRAMMABLE COMBINATION LOCKING CAP

CROSS-REFERENCE TO RELATED APPLICATION

This application is based upon and claims the benefit of U.S. provisional application No. 61/533,691, entitled "Container Having a Programmable Combination Locking Cap," filed Sep. 12, 2011, the entire disclosure of which is herein specifically incorporated by reference for all that it discloses and teaches.

BACKGROUND

A child-resistant mechanism on containers such as, but not limited to, medicine bottles is crucial in the avoidance of allowing people such as children to access a bottle's contents. Containers such as prescription bottles are very common in today's world and unauthorized people are sometimes able to gain unauthorized access to such containers.

SUMMARY

An embodiment of the present invention may therefore comprise a container having a programmable combination locking cap comprising: a canister adapted to hold contents, the canister having a canister alignment arrow; at least three rings having identifying elements on a front surface of a front portion of the at least three rings and ring tabs on a back portion of the at least three ring tabs that can be removed to provide tab openings that set a combination code; a cap base on which the at least three rings are adjacently aligned; at least three canister tabs located on the canister that interlock with the ring tabs to prevent removal of the combination locking cap; a top, having a cap base alignment arrow, that secures the at least three rings to the cap base; an unlocking opening disposed in the cap base so that when the tab openings are aligned with the cap base alignment arrow and the canister alignment arrow, the locking cap may be freely removed from the canister.

An embodiment of the present invention may therefore further comprise a container having a programmable combination locking cap comprising: a canister adapted to hold contents, the canister having a canister alignment arrow; at least three outer rings having inner grooves on an interior surface and identifying elements on a front surface; at least three bezels having projections on an outer surface that engage the inner grooves of the at least three outer rings in a manner that allows the identifying elements on the front surface of the at least three outer rings to be oriented with respect to the at least three bezels to create a desired combination, each bezel of the at least three bezels having a first end and a second end, the first end and the second end forming a bezel slot; an assembly base having an assembly base projection; a cap base having an unlocking slot that is aligned with and engages the assembly base projection to allow the cap base to slide over and be assembled with the assembly base and allow the at least three bezels to be placed over the cap base with the bezel slot at each of the at least three bezels aligned with the assembly base projection; a top, the top having a cap base alignment arrow, that secures the at least three outer rings and the at least three bezels to the cap base; at least three canister tabs located on the canister that are aligned with the canister alignment arrow that prevent the locking cap from being removed from the canister unless the bezel slot of each bezel of the at least three bezels is aligned with the at least three canister tabs on the canister and the canister alignment arrow is aligned with the cap base alignment arrow on the top so that the locking cap may be removed.

An embodiment of the present invention may further comprise a method of programming a locking cap for a container comprising: providing a canister having a canister alignment arrow, the canister adapted to hold contents; providing at least three rings having identifying elements on a front surface of a front portion of the at least three rings and ring tabs disposed on a back portion of the at least three rings; removing selected ring tabs from the at least three rings to create tab openings that set a combination code; providing a cap base having a cap base opening; placing the at least three rings on a cap base so that the tab openings are aligned with the cap base opening; providing at least three canister tabs located on the canister; placing the cap base on the canister so that the cap base opening is aligned with the canister tabs; securing a top, having cap base alignment arrow, to the cap base so that the cap base alignment arrow is aligned in a predetermined orientation with respect to the cap base, so that the locking cap can be removed from the canister when the cap base alignment arrow is aligned with the canister alignment arrow and the at least three canister tabs are aligned with the tab openings.

An embodiment of the present invention may further comprise a method of programming a locking cap for a container comprising: providing a canister having a canister alignment arrow, the canister adapted to hold contents; providing at least three outer rings having inner grooves on an interior surface and identifying elements on a front surface of the at least three outer rings; providing at least three bezels having bezel projections on an outer surface that are adapted to engage the inner grooves, each bezel of the at least three bezels having a first end and a second end so that the first end and the second end form a bezel slot; providing an assembly base having an assembly base projection; sliding a cap base, having a cap base unlocking slot, on top of the assembly base so that the projection of the assembly base is aligned with the unlocking slot; coding a combination by aligning the at least three outer rigs with the at least three bezels so that the inner grooves of the at least three outer rings interlocks with the projections of the at least three bezels so that the slot of the at least three bezels is aligned with a desired identifying element of the identifying elements on the at least three outer rings; placing the at least three bezels that are assembled with the at least three outer rings around the cap base so that the bezel slot is aligned with the cap base unlocking slot; securing a top to the cap base that secures the at least three outer rings and the at least three bezels to the cap base, the top having a cap base alignment arrow; providing at least three canister tabs, located on the canister, that engage the at least three bezels and do not allow the locking cap from being removed from the canister unless the bezels are properly aligned with the at least three canister tabs and the canister alignment arrow is aligned with the cap base alignment arrow so that the locking cap may be removed.

DETAILED DESCRIPTION OF THE EMBODIMENTS

Figure 1:
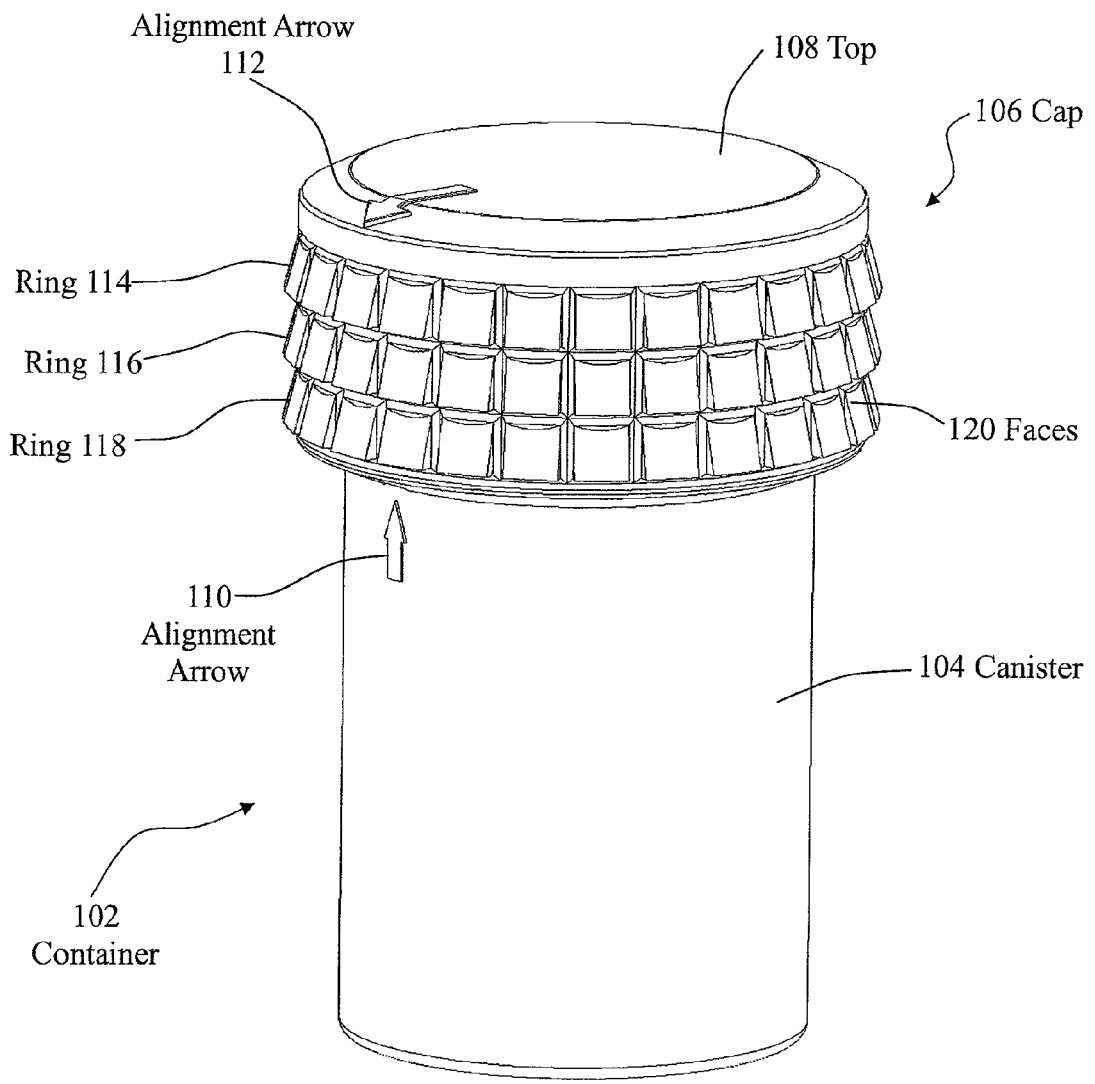
FIG. 1 is an isometric side view of an embodiment of a container having a programmable locking mechanism.

FIG. 1 is an isometric side view of an embodiment of a container having a programmable blocking mechanism. FIG. 1 shows container 102 having a canister 104. Canister 104 can hold various items, including prescription drugs to which the user may desire to restrict access. Such items include, but are not limited to, prescription drugs, alcohol, money, jewelry and any other content that the user desires. Unauthorized persons gaining access to prescription drugs is a dangerous problem. Unauthorized persons can overdose and die. Children are often times able to open child proof locks on bottles, and teenagers are able to access prescription drugs of their parents and have "pharming parties," wherein teenagers get together with their parents prescriptions and take them with their friends. In addition, the center for disease control has classified prescription drug abuse as an epidemic.

As shown in FIG. 1, container 102 has cap 106 that is locked onto canister 104. Cap 106 has rings 114, 116, 118 that are aligned adjacently to each other so that each ring 114, 116, 118 has numerous faces that are in angled position. Faces 120 are in an angled position so that letters or numbers can be directly molded onto the faces 120, which facilitates easy reading of the letters or numbers. Faces 120 may also be flat if letters or numbers are directly printed onto each of the faces 120. Rings 114, 116, 118 are aligned adjacently to each other so that cap 106 creates a combination lock that allows cap 106 to be secured to and removed from canister 104. Cap 106 is covered by top 108, which has alignment arrow 112. When rings 114, 116, 118 are properly aligned to a correct combination, alignment arrow 112 located on top 108 and alignment arrow 110 are correctly aligned with the proper combinations of the letters or numbers on faces 120 of rings 114, 116, 118. Cap 106 can then be freely removed from canister 104 when the correct combination is aligned with alignment arrow 112 and alignment arrow 110. A three ring combination lock provides 17,576 possible combinations. Integration of the code directly on to rings 114, 116, 118 eliminates elements, such as stickers which can be removed.

Figure 2:
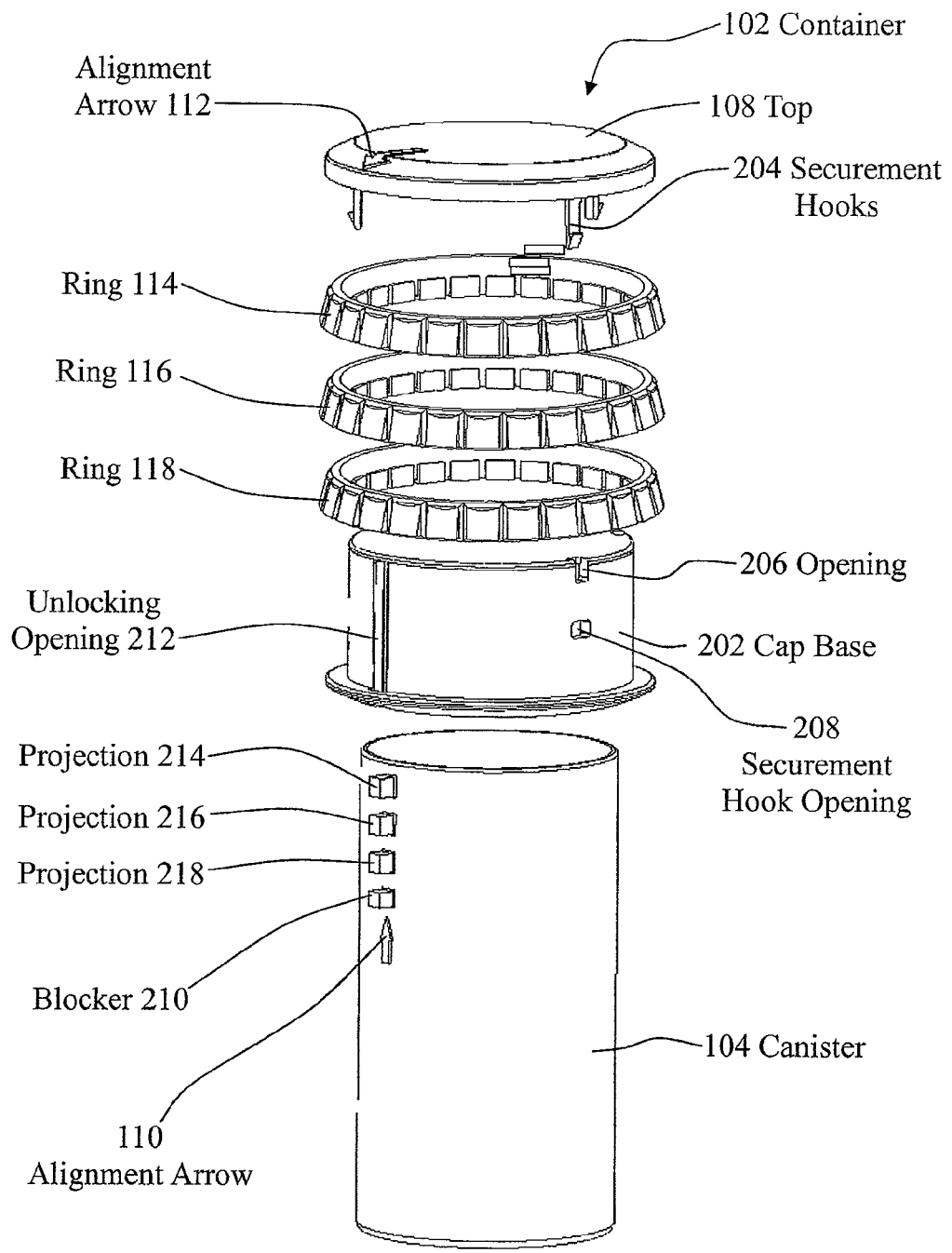
FIG. 2 is an exploded isometric side view of FIG. 1.

FIG. 2 is an exploded view of container 102 that was shown in FIG. 1. Rings 114, 116, 118 are set on cap base 202 and secured together by top 108 using securement hooks 204 that enter opening 206 and hook onto securement hook opening 208 so that top 108 is securely attached to cap base 202. Canister 104 has projection 214, 216, 218 and blocker 210. When unlocking opening 212 is properly aligned with projections 214, 216, 218, and alignment arrow 112 is properly aligned with alignment arrow 110, container 102 can be successfully opened. In other words, when rings 114, 116, 118 have the proper combination aligned with alignment arrow 112 and alignment arrow 110, container 102 may be successfully opened. Blocker 210 is a blocking mechanism so that a user cannot turn container 102 upside down and successfully see the proper combination of container 102. In other words, when unlocking opening 212 is properly aligned with projections 214, 216, 218, and rings 114, 116, 118 are properly aligned, container 102 may be successfully opened.

Figure 3:
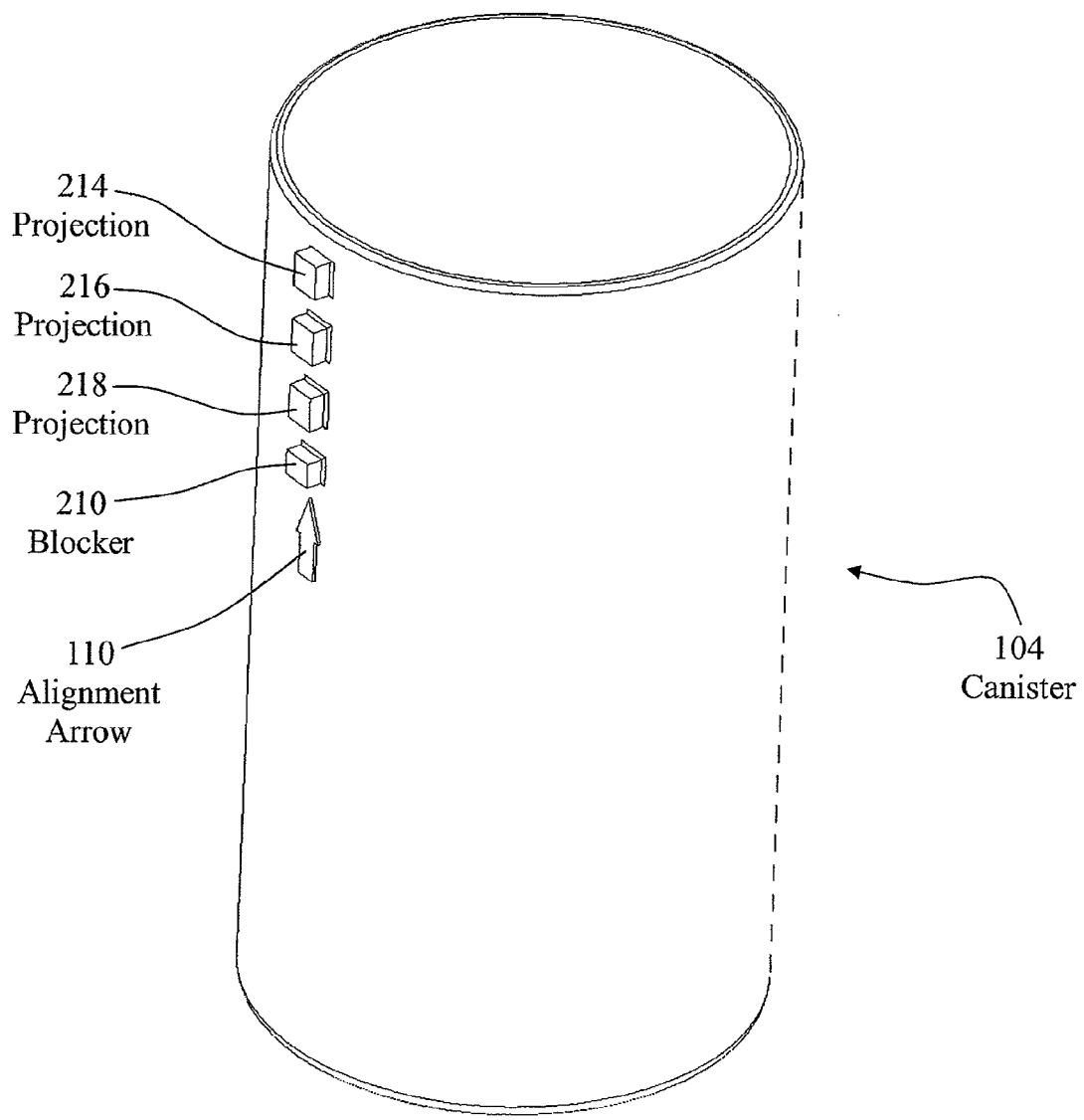
FIG. 3 is an isometric side view of the canister of FIG. 2.

FIG. 3 is an isometric side view of canister 104. Canister 104 shows projection 214, 216, 218, blocker 210 and alignment arrow 110. Projections 214, 216, 218 are used to prevent cap 106 (FIG. 1) from becoming released from canister 104 unless the correct combination code is in alignment.

Figure 4:
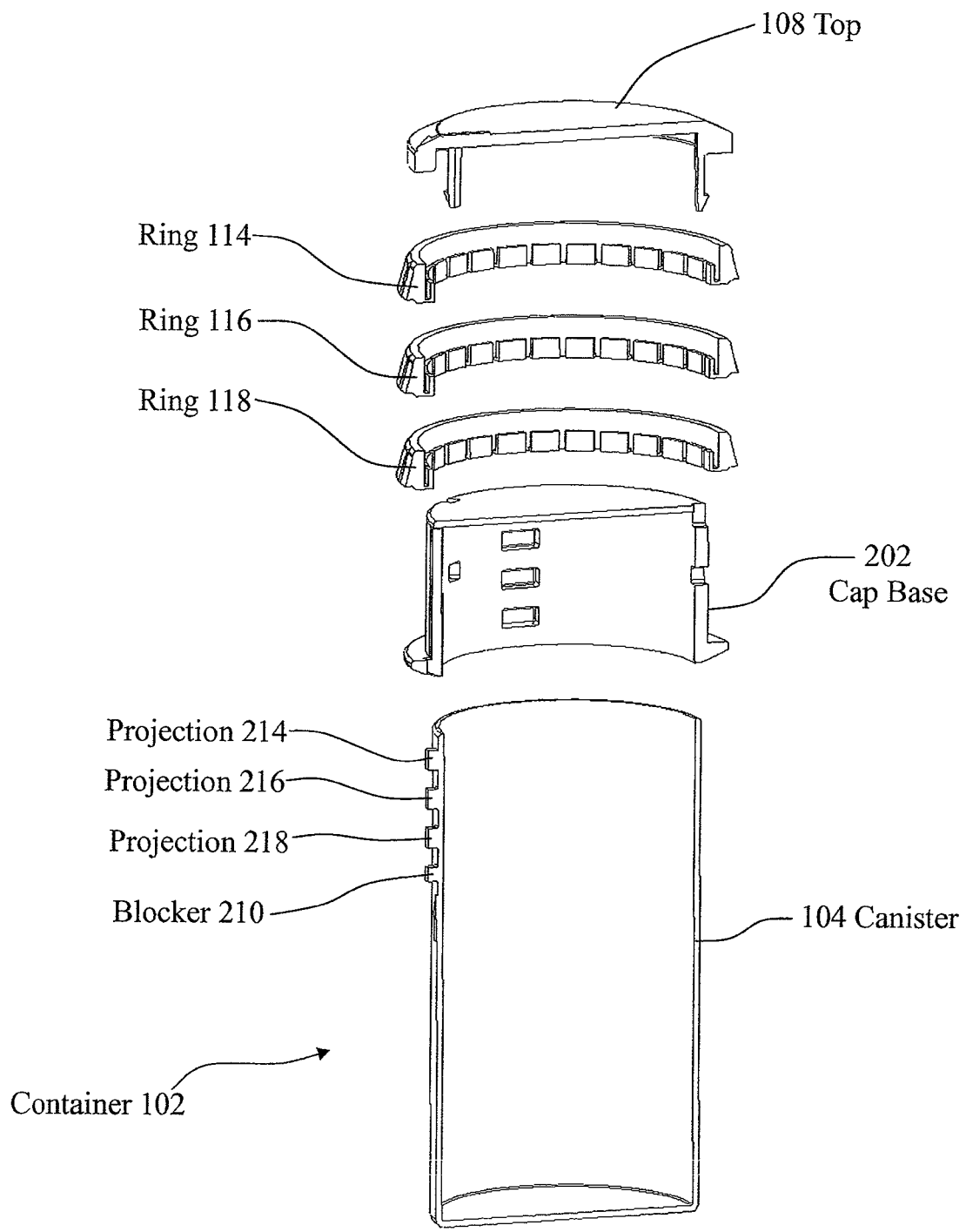
FIG. 4 is an isometric cross sectional view of FIG. 2.

FIG. 4 is an exploded cross sectional view of container 102. Rings 114, 116, 118 rest adjacently on cap base 202 so that cap base 202 and rings 114, 116, 118 are secured by top 108. Canister 104 has projections 214, 216, 218 and blocker 210.

Figure 5:
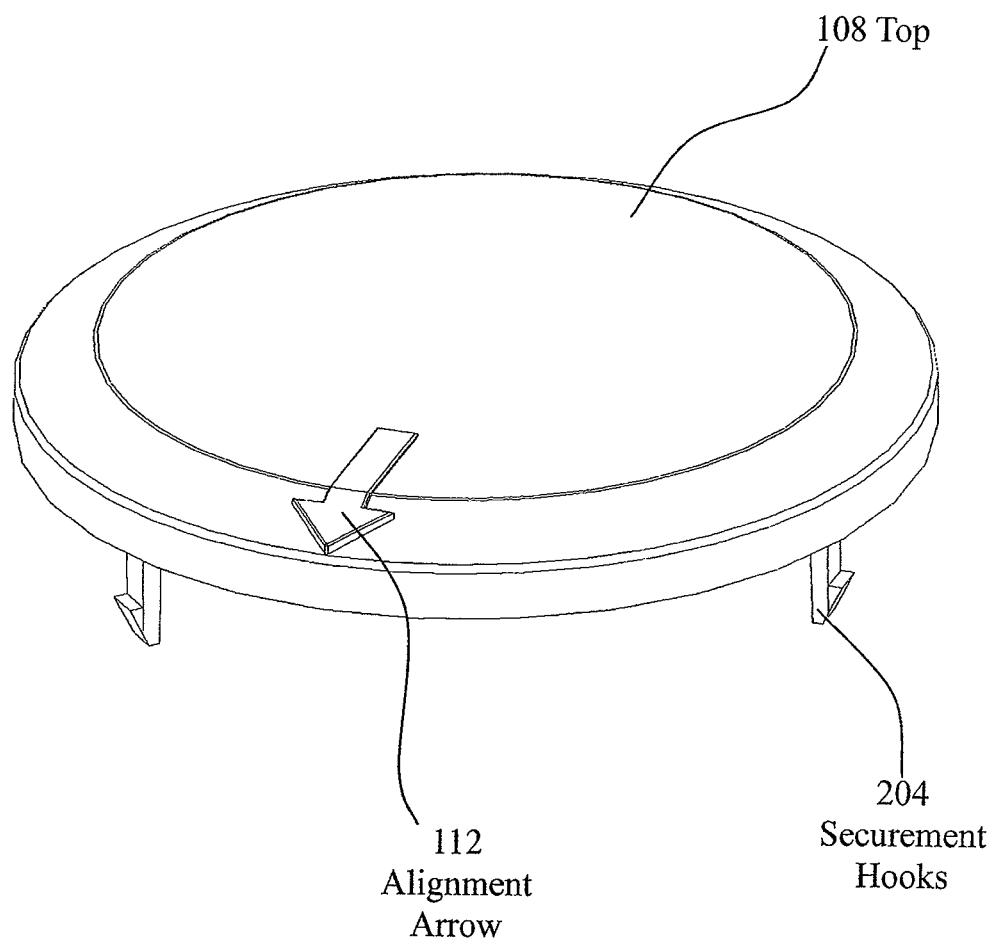
FIG. 5 is an isometric view of the top of FIG. 2.

FIG. 5 is an isometric view of top 108 showing securement hooks 204 and alignment arrow 112. The securement hooks 204 attach top 108 to cap base 202, shown in FIG. 4, so that top 108 secures rings 114, 116, 118 to cap base 202.

Figure 6:
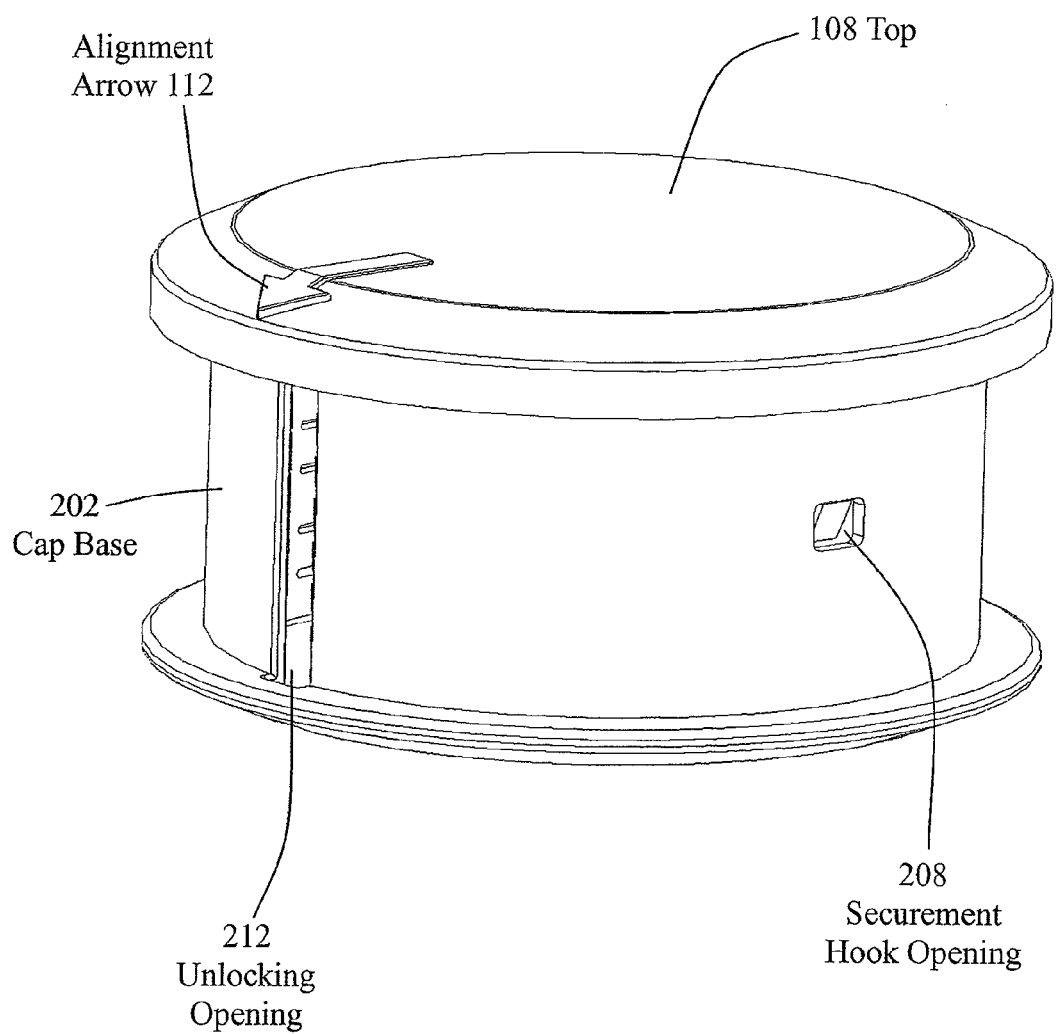
FIG. 6 is an isometric side view of the cap base of FIG. 2.

FIG. 6 is an isometric view of top 108 secured with cap base 202 assembled together without rings 114, 116, 118, shown in FIG. 4. FIG. 6 also shows unlocking opening 212, which is used to slide off cap base 202 from canister 104 as shown in FIG. 1. FIG. 6 also shows top 108 secured with securement hook opening 208 so that top 108 and cap base 202 are securely held together.

Figure 7:
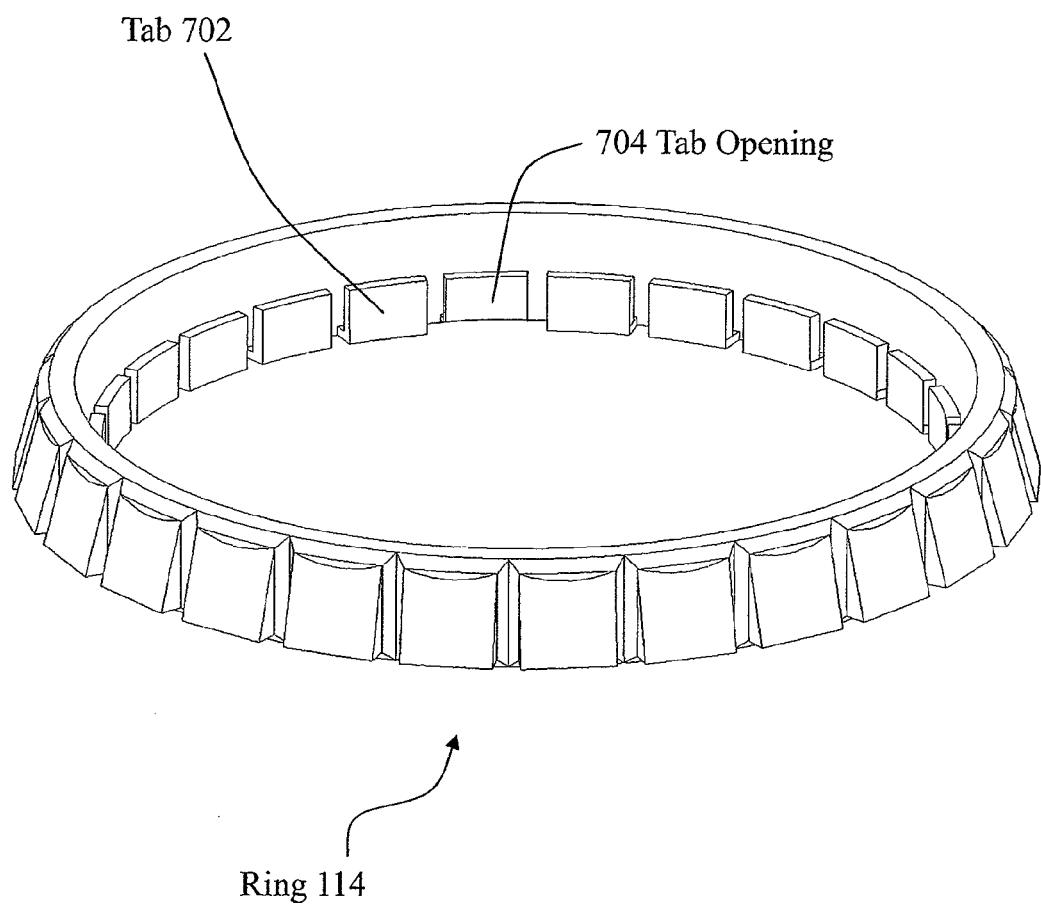
FIG. 7 is an isometric side view of the ring of FIG. 2.

FIG. 7 shows ring 114 having tabs 702. In order to set the combination code for ring 114 as well as rings 116, 118 as was shown in FIG. 1, a tab 702 must be removed, creating a tab opening 704, to set the combination code for each ring 114 shown in FIG. 7 and rings 116, 118 shown in FIG. 1. When a tab 702 is removed from each of the rings 114, 116, 118, and is properly aligned with projections 214, 216, 218, cap 106 (FIG. 1) may be removed from canister 104 (FIG. 1) because tabs 702 on rings 114, 116, 118 (FIG. 1) are no longer a barrier for the projections on canister 104 (FIG. 2).

Figure 8:
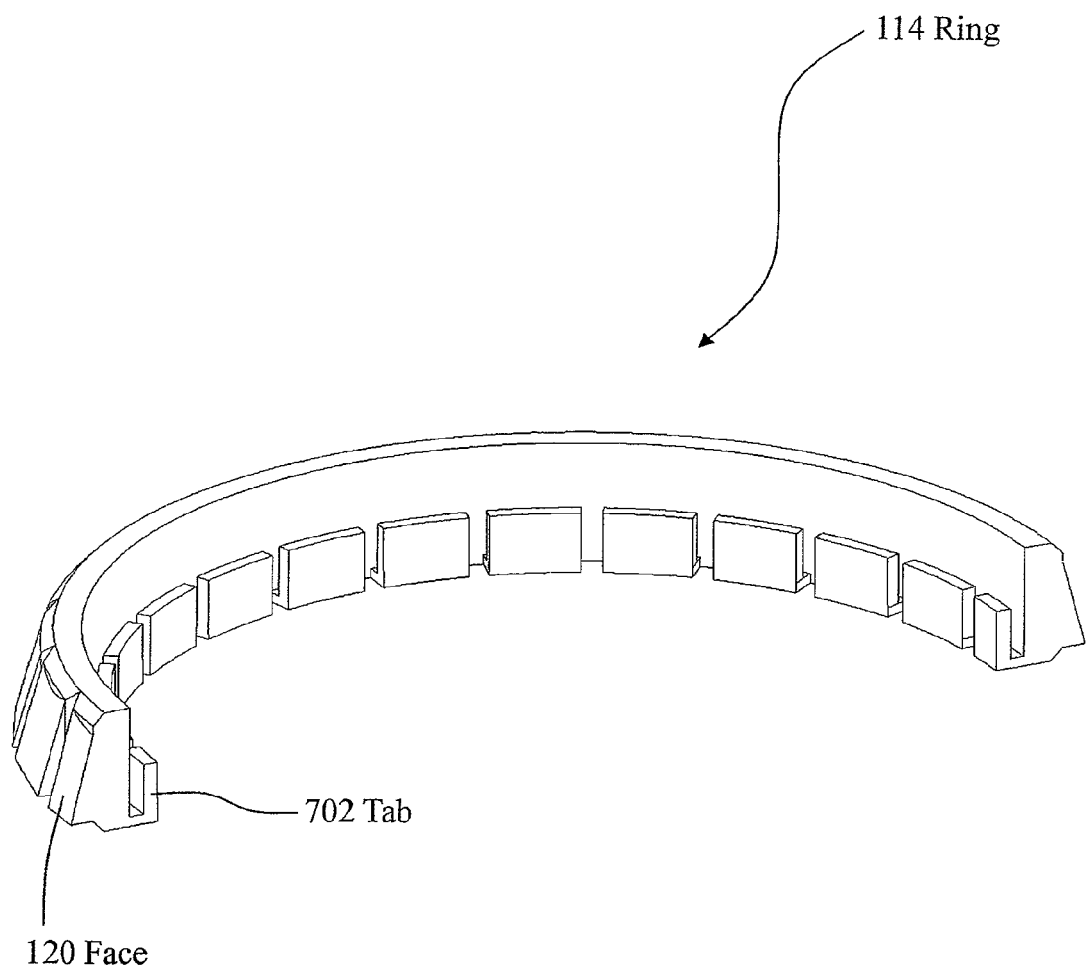
FIG. 8 is an isometric cross sectional side view of FIG. 7.

FIG. 8 is an isometric view of FIG. 7 showing ring 114 and tab 702 that can be broken off to set a combination code for ring 114. In other words, a tab such as tab 702 may be broken away from ring 114. Each tab is aligned with a letter or number on face 120, which becomes part of the desired combination code. Tab 702 may be broken away by either a pharmacist at a pharmacy or may be broken away by the user. A simple object like a small screwdriver, chisel or knife could be used to break off a desired tab 702 off of ring 114 to set the letter on face 120 for the combination. Once tab 702 is broken off, the ring is permanently coded for that letter or number on face 120. In this way, each combination can be locally set to a desired code, verses each container having a fixed code that is set at a manufacturer. A pharmacist or user can set a private, personal code so that the code remains consistent for the user much like a personal "pin" number.

Figure 9:
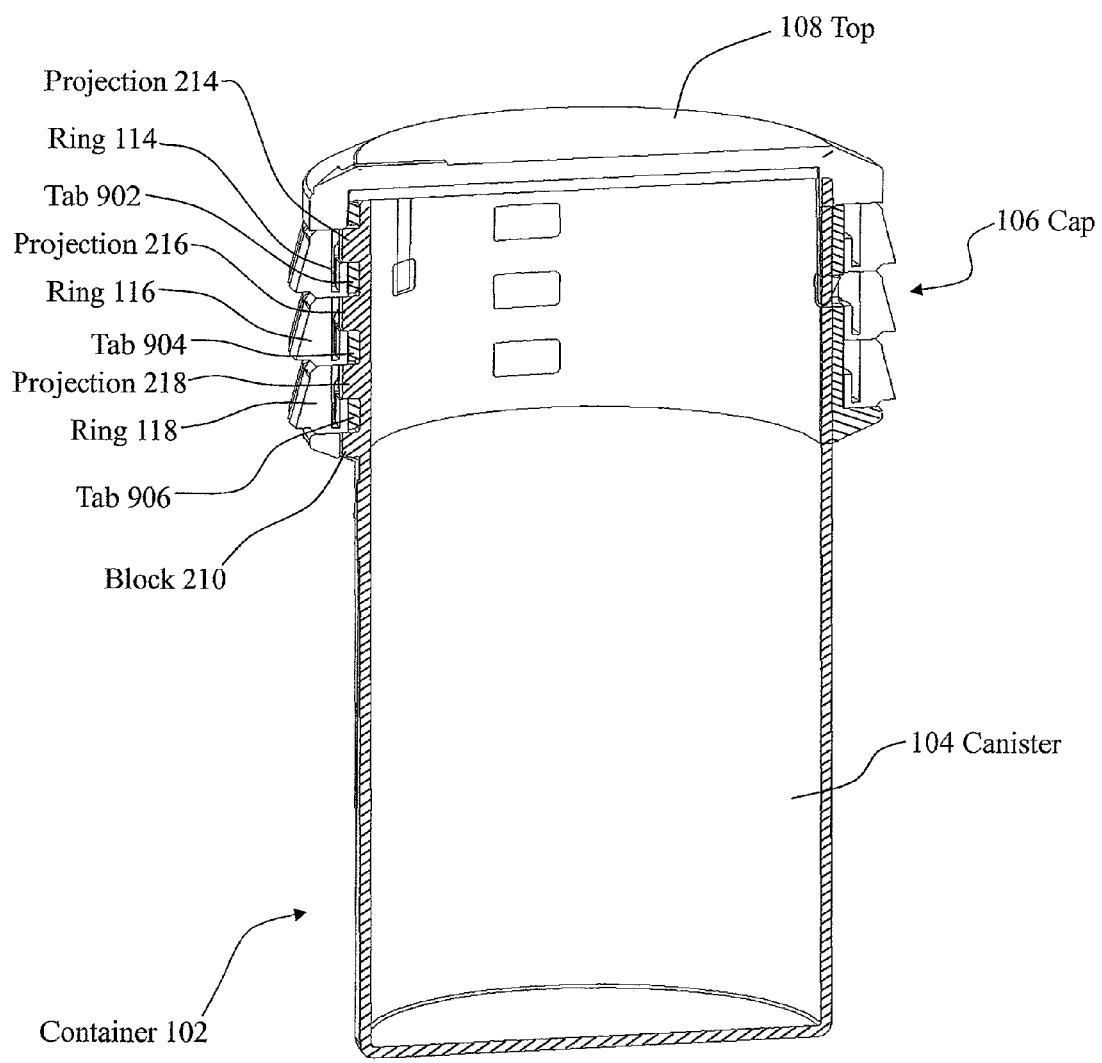
FIG. 9 is an isometric cross sectional side view of FIG. 1.

FIG. 9 is an isometric cross sectional view of FIG. 1. FIG. 9 shows top 108 secured to cap 106. Projections 214, 216, 218 are located on canister 104 that engage with tabs 902, 904, 906 on rings 114, 116, 118 respectively, so that the engagement of tabs 902, 904, 906 with the projections 214, 216, 218 locks cap 106 in place on canister 104 until the rings 114, 116, 118 are properly aligned. In other words, rings 114, 116, 118 must be properly aligned with the correct combination code in accordance with the broken off tabs on the interior rings 114, 116, 118, and the broken off tabs must be aligned so that cap 106 can be removed from canister 104. For example, if tab 902 was removed from ring 114, tab 904 was removed from ring 116 and tab 906 was removed from ring 118, and tabs 902, 904, 906 are properly aligned with unlocking opening 212 on cap base 202 from FIG. 2, then cap base 206 can be removed from canister 104 because the proper combination code is aligned.

Figure 10:
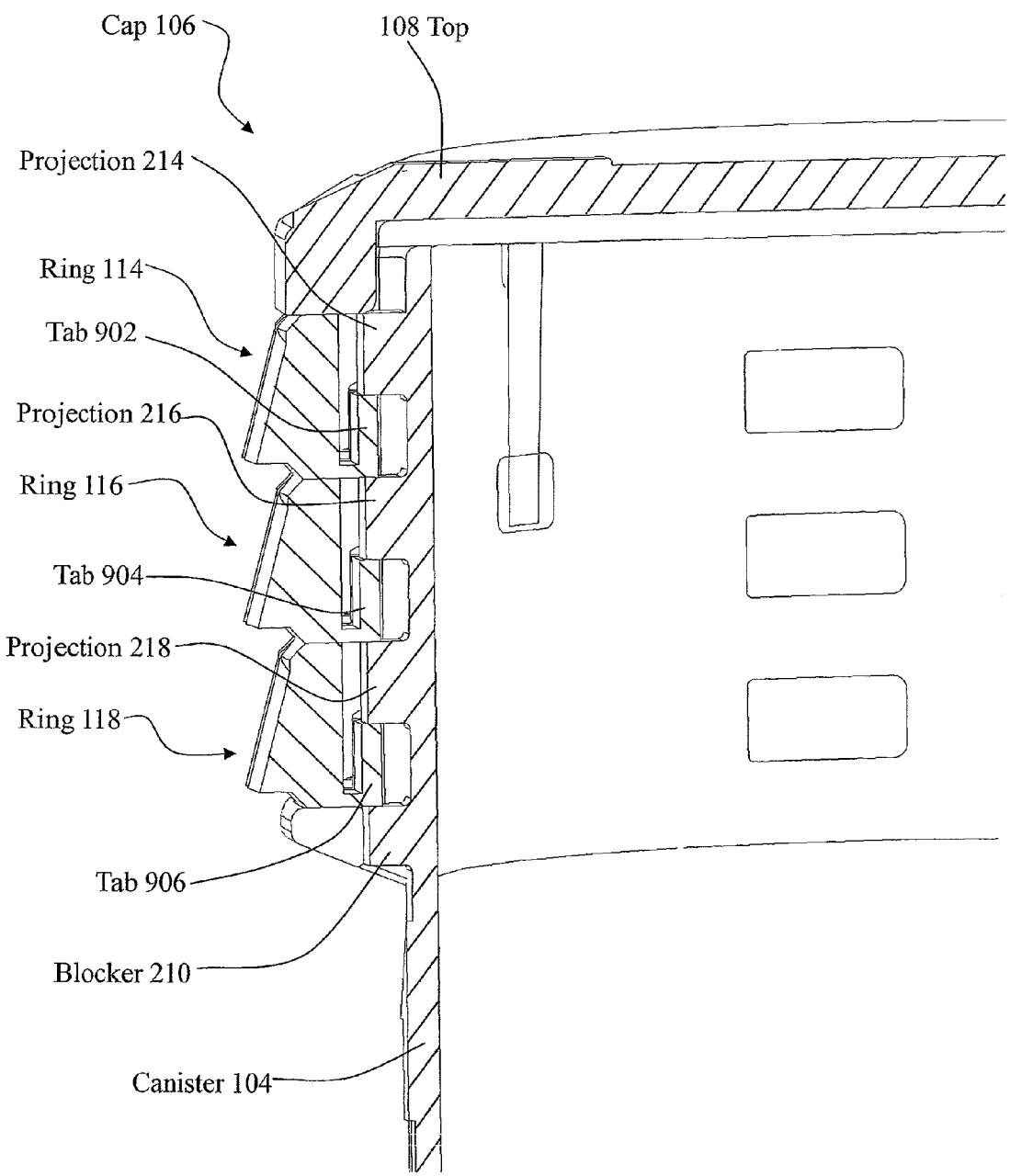
FIG. 10 is a close up view of FIG. 9.

FIG. 10 is a close-up view of FIG. 9 showing top 108 and projections 214, 216, 218 located on canister 104. The engagement of tab 902 and projection 214 located by ring 114 engages tab 902 so that cap 106 may not be removed. In a similar manner, projection 216 is engaged with tab 904 on ring 116 so that cap 106 may not be removed. Likewise, projection 218 prevents tab 906 from becoming disengaged from cap 106, which is located on ring 118. Blocker 210 blocks the view of which tabs have been broken off, such as tabs 902, 904, 906, when canister 104 is turned upside down so that the code cannot be seen.

Figure 11:
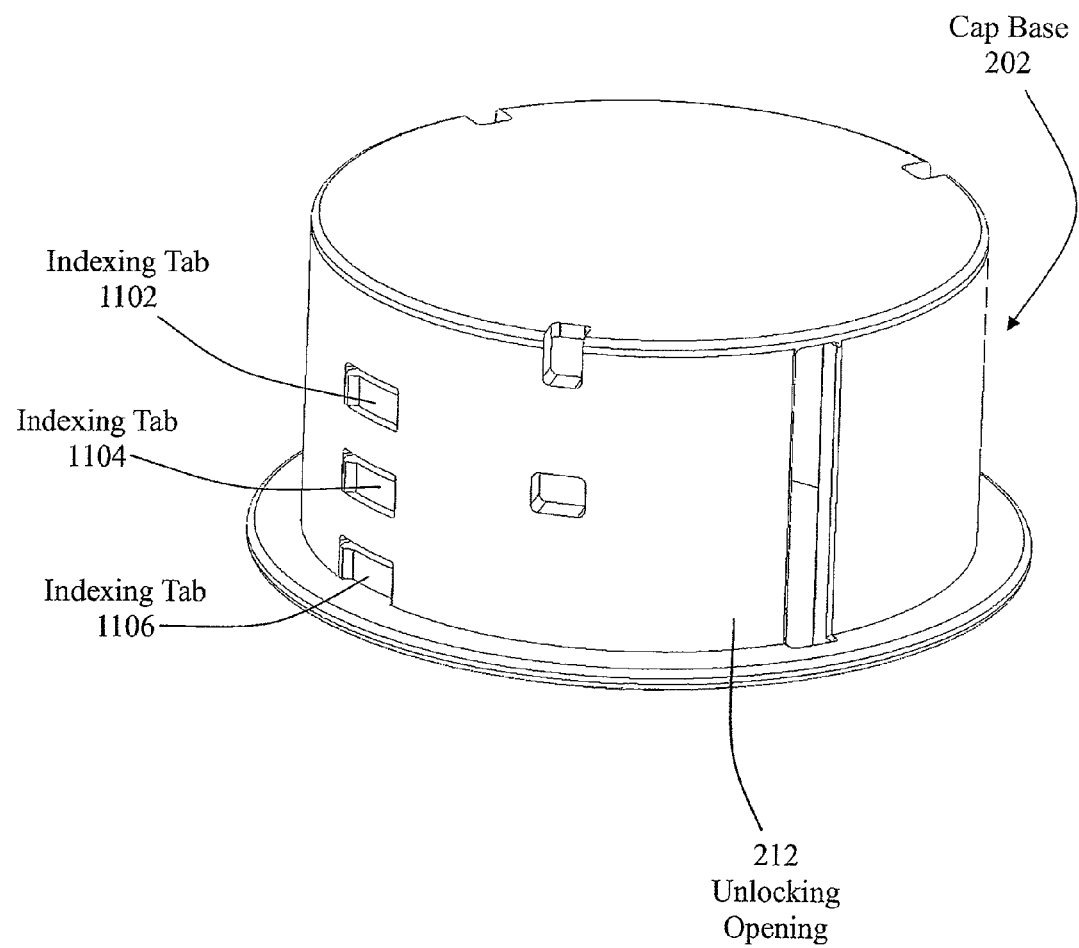
FIG. 11 is an isometric side view of cap base of FIG. 2.

FIG. 11 is an isometric view of cap base 202 showing unlocking opening 212. When each ring 114, 116, 118 is coded with a combination and the internal tabs are removed for the desired combination, the projections 214, 216, 218 located on canister 104 are able to freely slide through unlocking opening 212 on cap base 202. Indexing tabs 1102, 1104, 1106 are used to index and align the letters or numbers located on rings 114, 116, 118. In other words, the purpose of indexing tabs 1102, 1104, 1106 are to create some resistance with the internal tabs of rings 114, 116, 118 so that the letters on rings 114, 116, 118 are properly indexed to the user's desired combination so that rings 114,116, 118 remain in place while removing cap 106 from canister 104 (FIG. 1). Alternatively, the outer surface of cap base 202 could have small ridges aligned vertically to help assist in the indexing.

Figure 12:
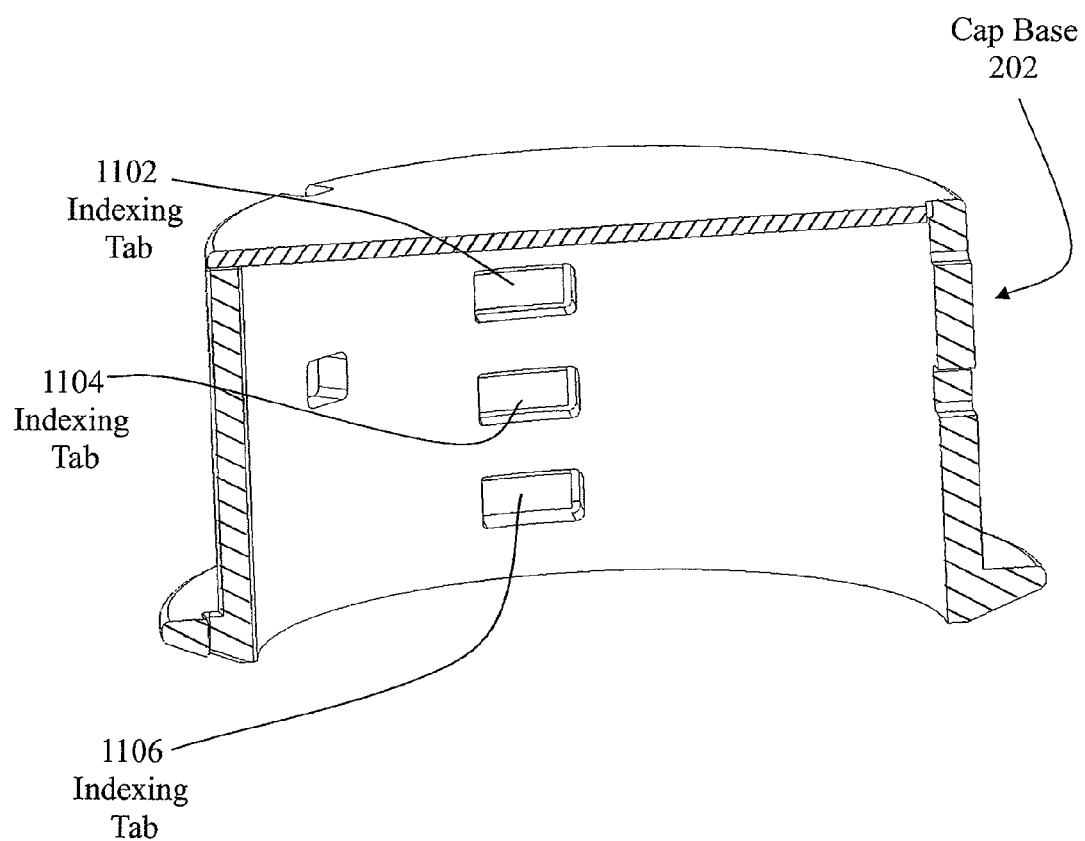
FIG. 12 is an isometric cross sectional view of FIG. 11.

FIG. 12 is an isometric cross-sectional view of cap base 202 shown in FIG. 11. FIG. 12 shows indexing tabs 1102, 1104, 1106 having lips that assist in preventing rings 114,116, 118 from freely rotating, thus making it easy for the user to keep rings 114,116, 118 properly aligned when removing cap 106 from canister 104 (FIG. 1) when the proper combination code is aligned.

Figure 13:
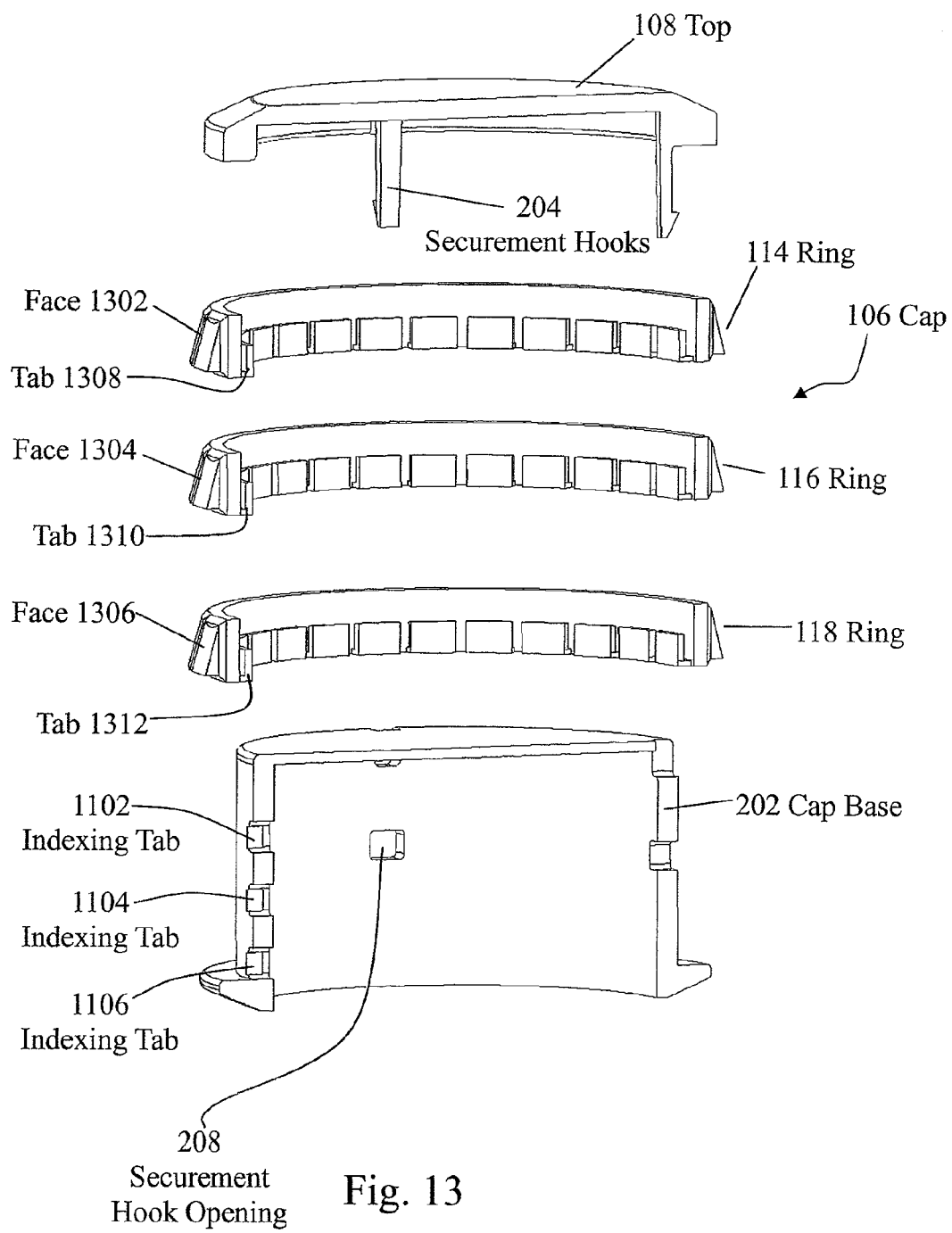
FIG. 13 is an isometric exploded cross sectional side view of the combination locking cap of FIG. 2.

FIG. 13 is an isometric, cross sectional, exploded view of cap 106 showing top 108 having securement hooks 204, rings 114, 116, 118 and cap base 202 having indexing tabs 1102, 1104, 1106 and securement hook opening 208 that is used to secure securement hooks 204 of top 108 to cap base 202. As an example of setting a combination code for rings 114, 116, 118, the user can choose a letter or number located on face 1302 and remove associated tab 1308, as well as choosing to remove tab 1310 from face 1304 and remove 1312 from face 1306. Accordingly, setting the combination code is simple to do on location for the pharmacist or a user at home. As stated above, a simple object like a small screwdriver, chisel or knife could be used to break the tabs off of rings 114, 116, 118 to set the letter for the combination. Once each tab 1308, 1310, 1312 is broken off, each ring 114, 116, 118 is permanently coded for that letter for each face 1302, 1304, 1306, respectively. By aligning all three rings 114, 116, 118 in a row, the areas with broken off tabs are allowed to slide over the projections 214, 216, 218, as shown in FIG. 2 on canister 104, thus allowing cap 106 to be removed. If all rings 114, 116, 118 are not correctly aligned, the cap 106 cannot not be removed. To further expedite the coding process, a device can be designed to rest on a bench. An assembled cap unit without any tabs removed can be placed on the device, and a desired combination code can be aligned with the arrow. The device can then be operated with a pull-down lever, such that a blade or tool would shear a break-away tab from the rings 114, 116, 118 and thus set the combination code for whichever letters are aligned. This is a process that would be rapid and allow for a combination code to be set in seconds. As stated before, faces on rings 114, 116, 118 are angled to facilitate a two-part process where the letters can be directly molded onto the rings 114, 116, 118. Another option would be to have the flat faces with letters or numbers printed on rings 114, 116, 118.

Figure 14:
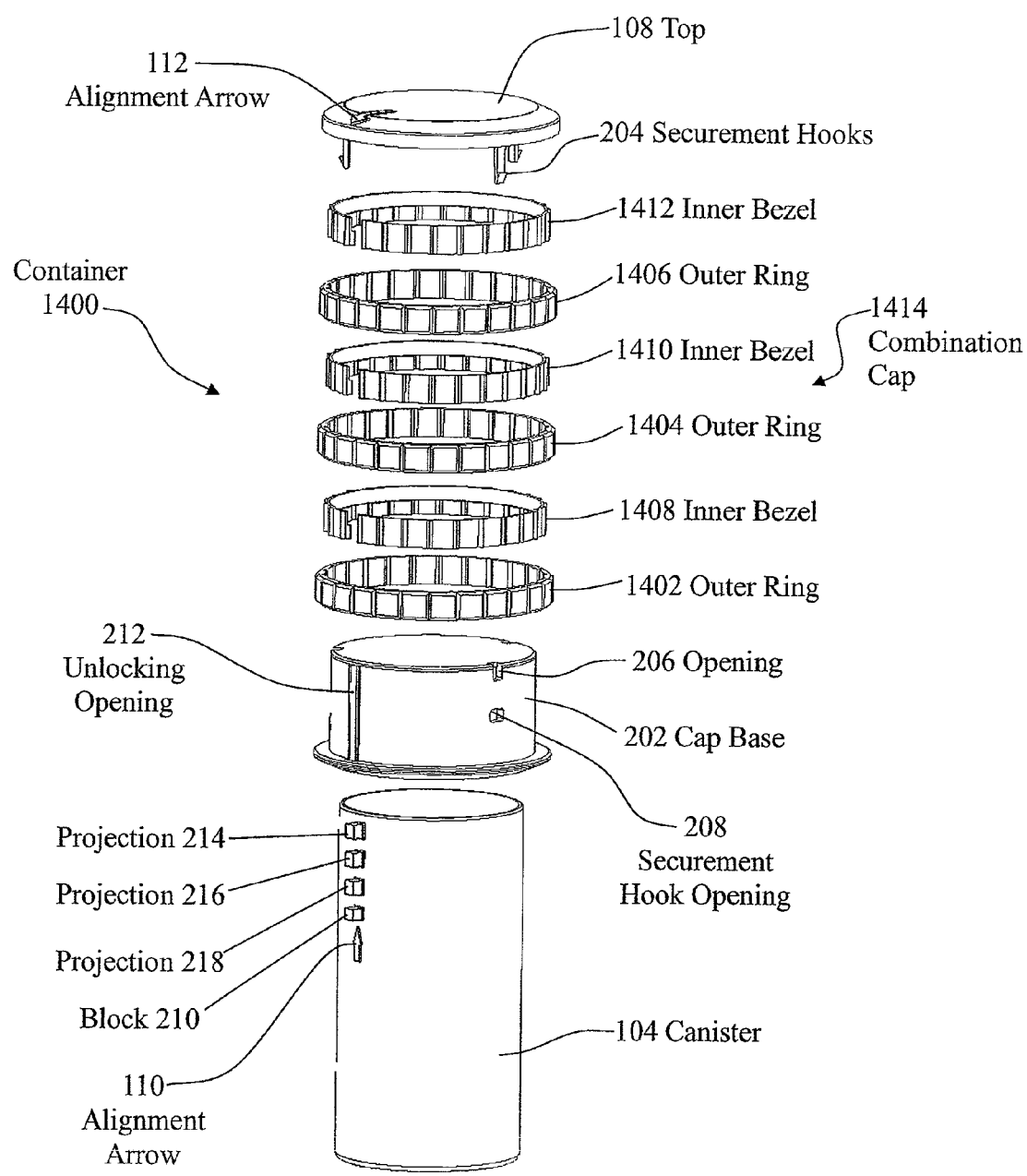
FIG. 14 an isometric exploded side view of another embodiment of a programmable combination locking cap.

FIG. 14 is another embodiment of a bottle having a programmable combination locking cap. FIG. 14 is an isometric, exploded view of container 1400. Container 1400 has canister 104 that can hold various contents such as prescription medication. Canister 104 has projections 214, 216, 218, which assists in the combination lock of container 1400. Blocker 210 on canister 104 is employed so that an unauthorized user is unable to see the coded combination lock. Top 108 having alignment arrow 112 fits into cap base 202 by securement hooks 204 entering opening 206 and hooking onto securement hook opening 208. Prior to top 108 being secured on cap base 202, a combination lock is employed by having inner bezels 1412, 1410, 1408 inside outer rings 1406, 1404, 1402. Hence, to assemble combination cap 1414 of container 1400, inner bezel 1408 is employed inside outer ring 1402 and outer ring 1404 is placed adjacent to outer ring 1402 with inner bezel 1410 inside outer ring 1404 and inner bezel 1412 inside outer ring 1406 so that outer 1406, 1404, 1402 are all placed adjacently to each other. In order to secure combination cap 1414, top 108 goes through the combination rings and is secured on cap base 202 by securement hooks 204. Cap base 202 also has an unlocking opening 212 so that when unlocking opening 212 is aligned with projections 214, 216, 218, combination cap 1414 may be removed from canister 104.

Figure 15:
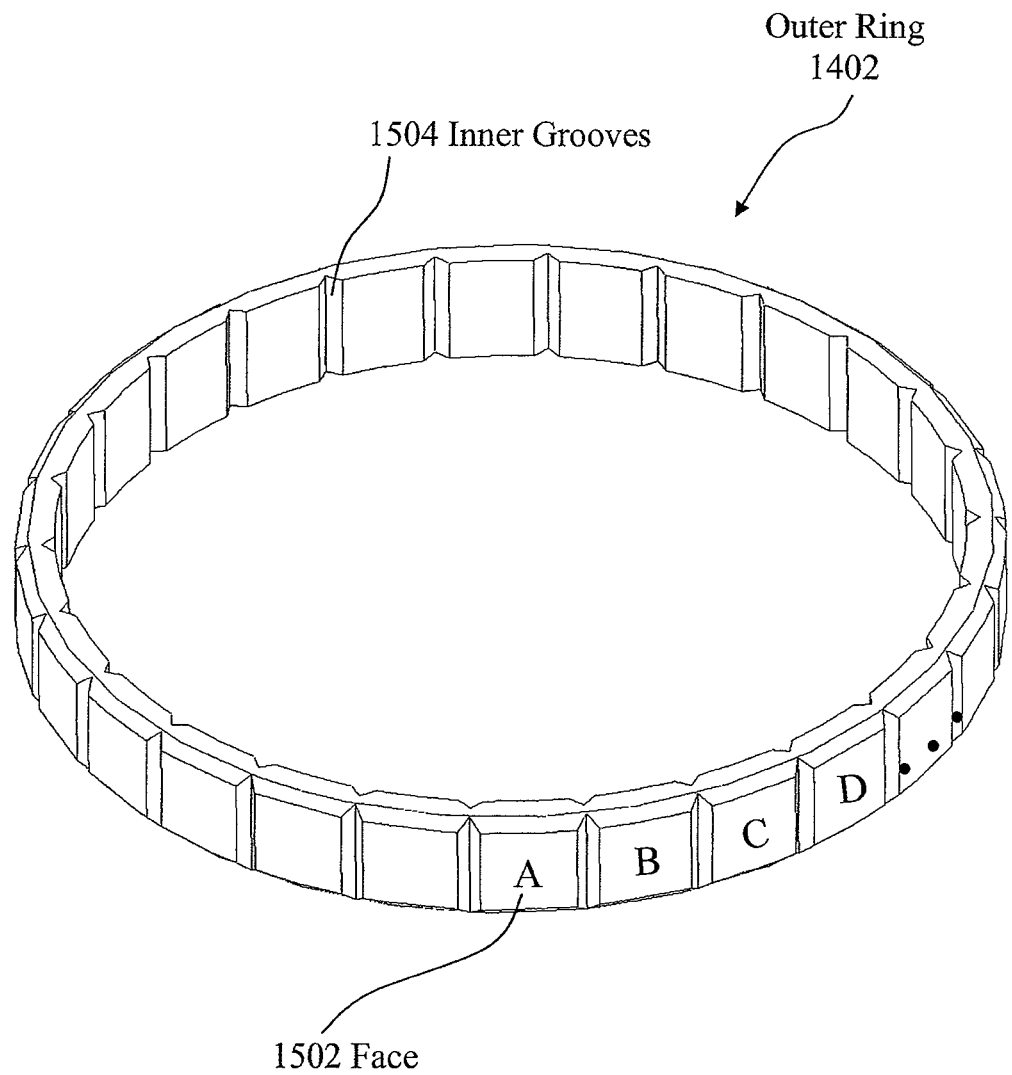
FIG. 15 is an isometric side view of outer ring of FIG. 14.

FIG. 15 is an isometric view of an outer ring 1402 shown in FIG. 14. Outer ring 1402 has faces 1502 so that numbers, letters, symbols or projections, such as Braille, may be employed in order to distinguish each face from another. In this manner, a user may solve the combination lock. Outer ring 1402 also has inner grooves 1504 that facilitate an inner bezel 1408 shown in FIG. 14 to secure that inner bezel 1408 inside outer ring 1402.

Figure 16:
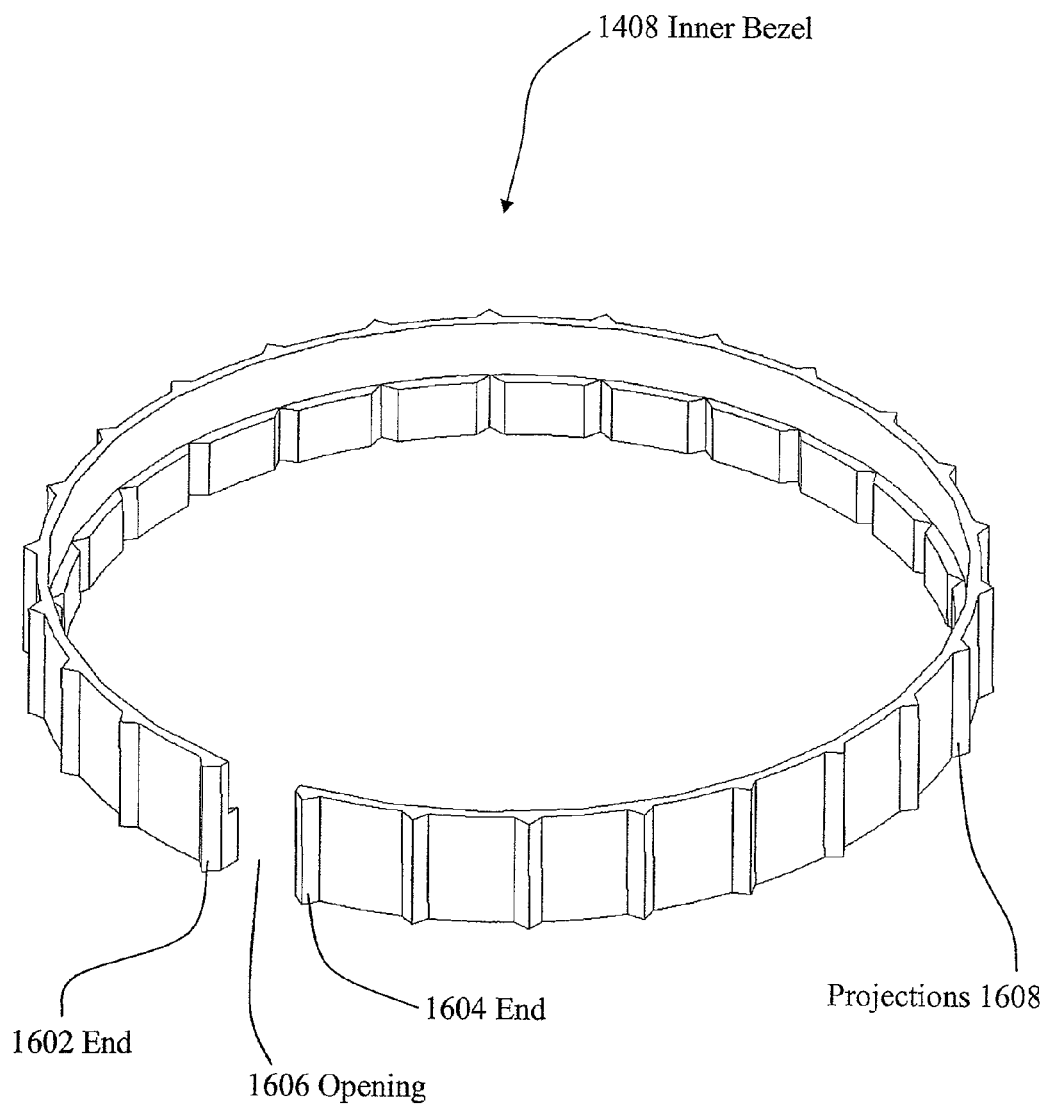
FIG. 16 is an isometric side view of an inner bezel of FIG. 14.

FIG. 16 is an isometric view of inner bezel 1408. Inner bezel 1408 has projection 1608 to interlock projection 1608 with inner grooves 1504 shown in FIG. 15 of outer ring 1402. Inner bezel 1408 also has ends 1602, 1604 with an opening 1606 that separates ends 1602 and 1604. Opening 1606 facilitates the setting of the code for the combination lock.

Figure 17:
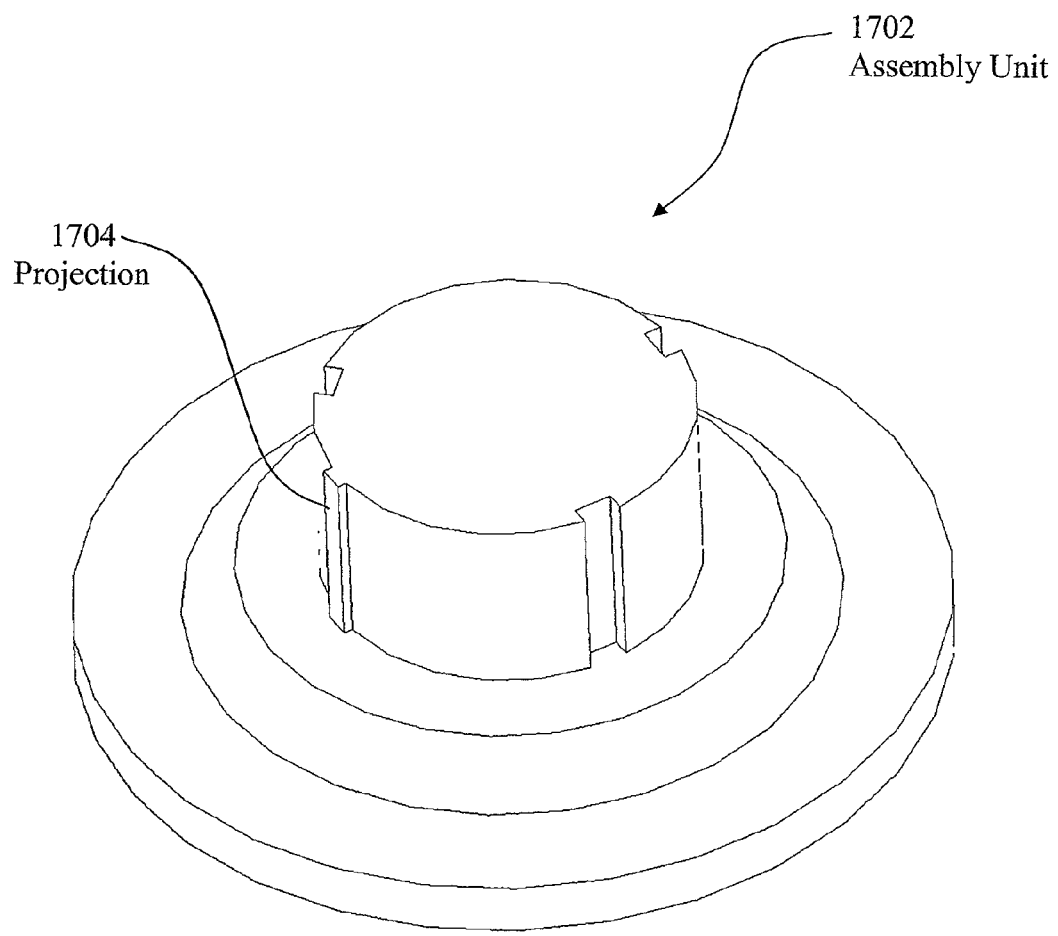
FIG. 17 is an isometric view of an assembly unit.

FIG. 17 is an isometric view of an assembly unit 1702. In order to quickly and easily set the code for the combination lock, an assembly unit 1702 may be used. Assembly unit 1702 has a projection 1704 employed to assist in separating ends 1602, 1604 of inner bezel 1408 (FIG. 16) so that the combination code can be easily set.

Figure 18:
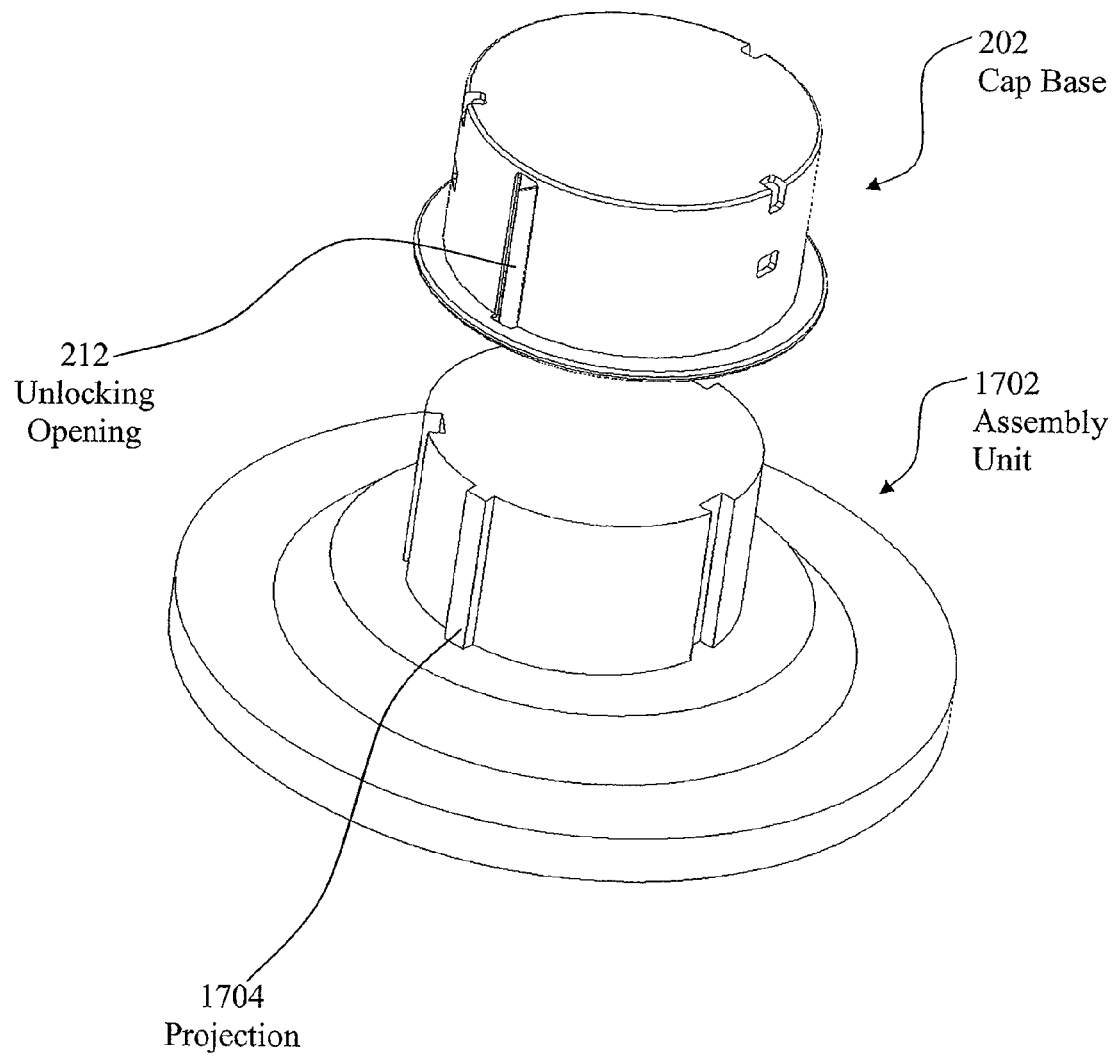
FIG. 18 is an isometric view of assembly unit of FIG. 17 and cap base of FIG. 14.

FIG. 18 is an isometric view of cap base 202 that is properly aligned with assembly unit 1702 so that unlocking opening 212 is aligned with projection 1704.

Figure 19:
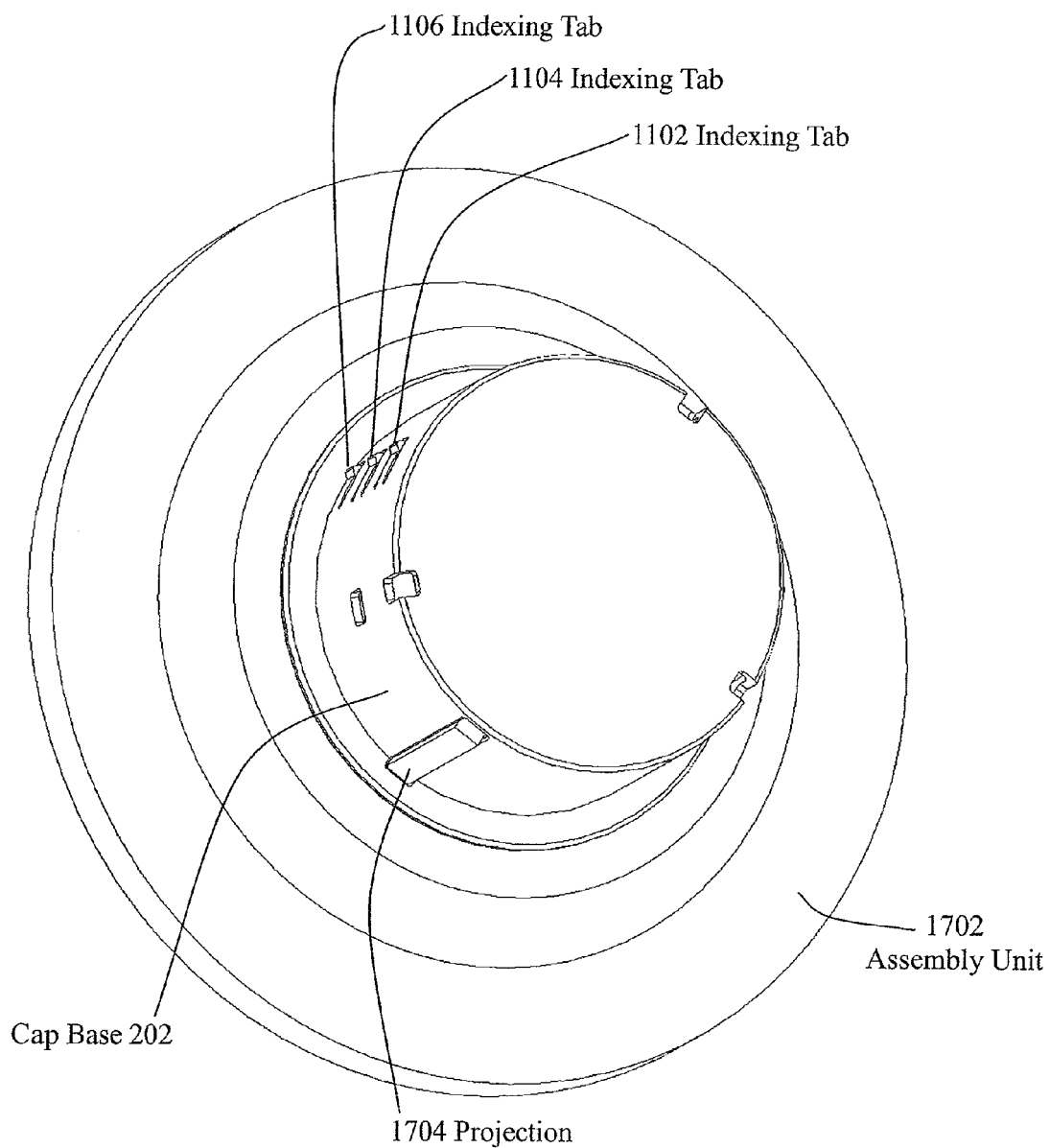
FIG. 19 is an isometric view of assembly unit and cap base of FIG. 18.

FIG. 19 is an isometric view of cap base 202 placed on assembly unit 1702 with projection 1704 of assembly unit 1702 protruding from cap base 202 so that the combination code can be easily and readily formed. Cap base also has indexing tabs 1102, 1104, 1106 that assist in indexing the inner and outer bezels of the combination lock when assembled. Because indexing tabs 1102, 1104, 1106 are flexible and cause resistance so that when the inner bezels and outer rings of the combination lock are employed, they do not move in a free manner so that the proper code remains in place and does not easily slip while removing combination cap 1044 from canister 104.

Figure 20:
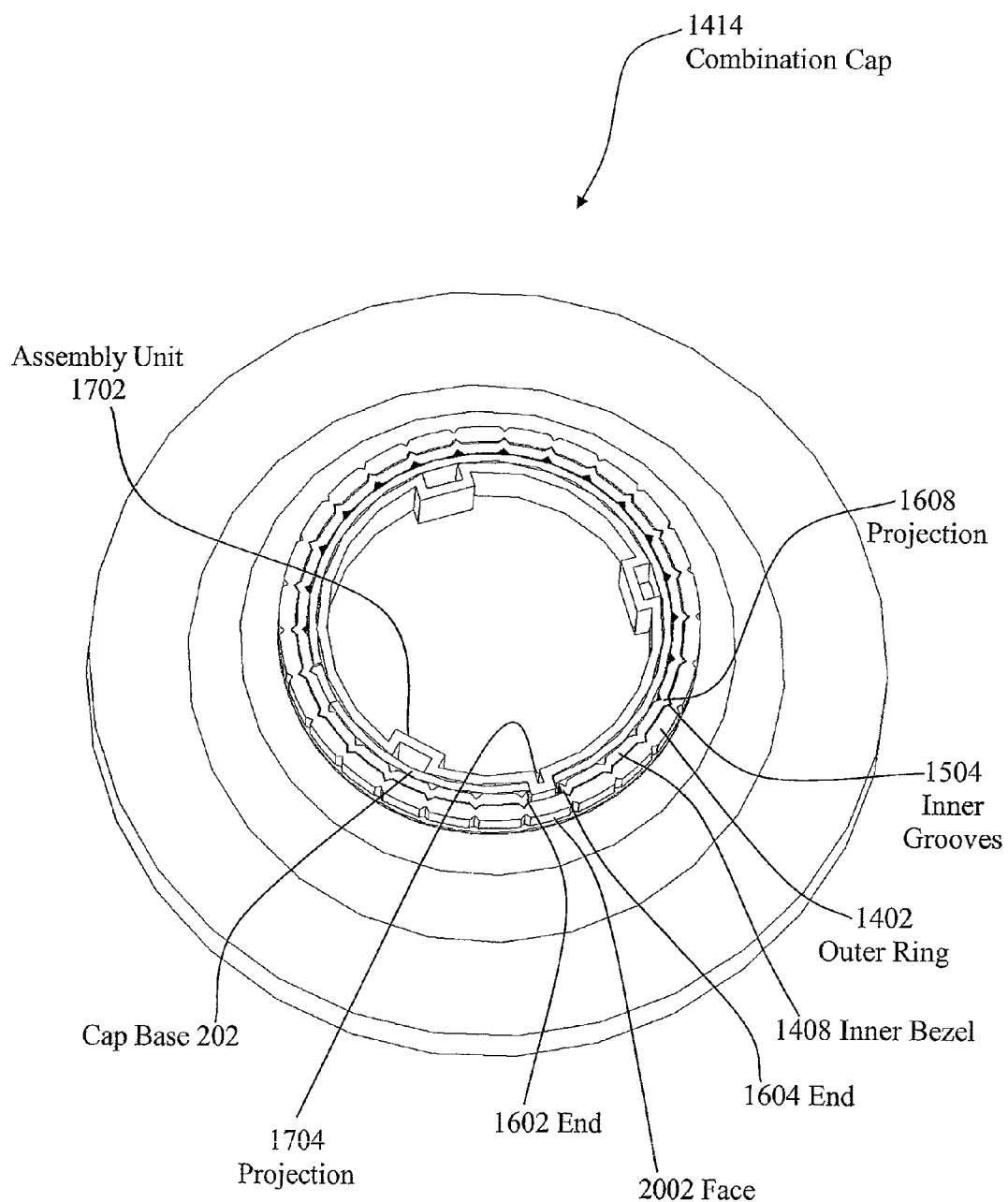
FIG. 20 is an isometric view of a combination cap on cap base of FIG. 19.

FIG. 20 is a top view of combination cap 1414 without top 108 employed. FIG. 20 shows assembly unit 1702 having projection 1704 that is disposed between ends 1602, 1604 of inner bezel 1408. Inner bezel 1408 remains secure against outer ring 1402 because projection 1608 interlocks with inner grooves 1504 of outer ring 1402. In that manner, projection 1704 creates a space that is fixed between ends 1602, 1604 so that face 2002 is one of the codes of the combination cap 1414. Cap base 202 is shown between assembly unit 1702 and inner bezel 1408.

Figure 21:
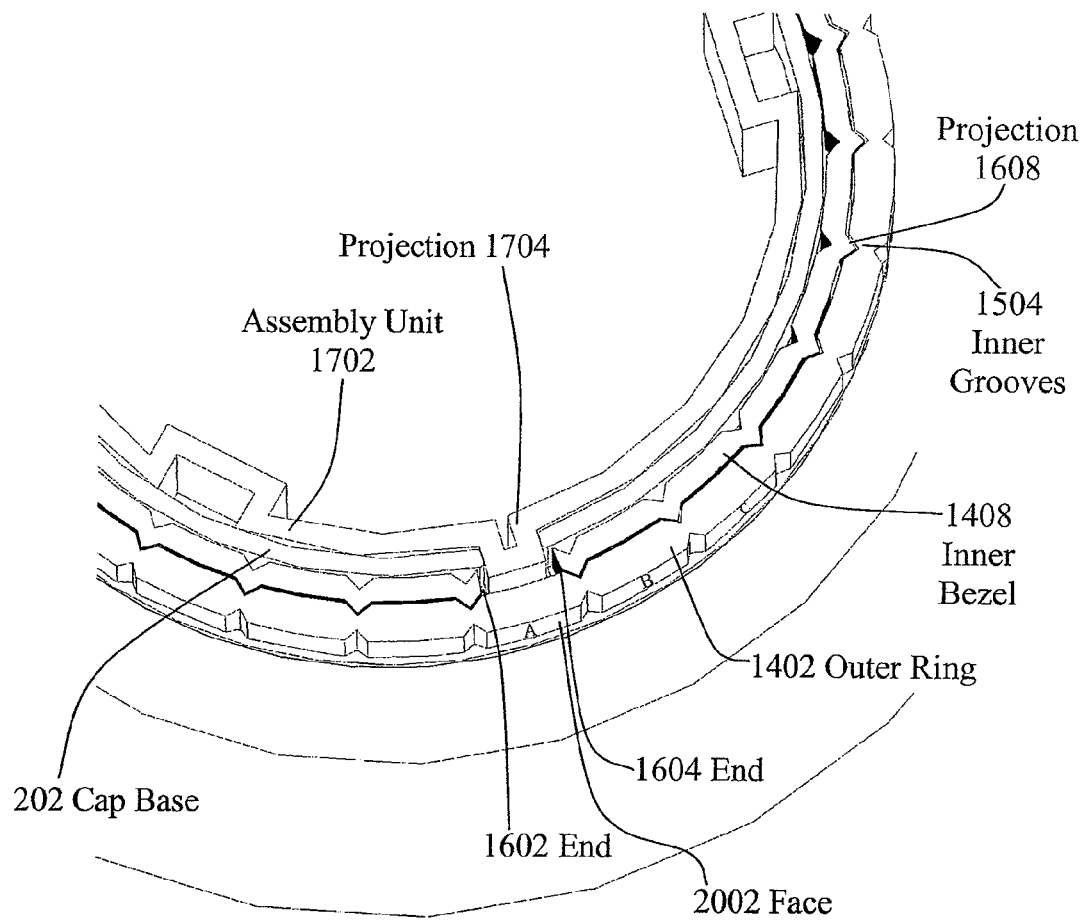
FIG. 21 is a close up view of FIG. 20.

FIG. 21 is a close-up view of FIG. 20 showing projection 1704 of assembly unit 1702 which creates a space between ends 1602, 1604 of inner bezel 1408. Outer ring 1402 interlocks with inner bezel 1408 by projection 1608 on inner bezel 1408 that interlocks with inner groove 1504 so that inner bezel 1408 remains in a fixed position inside outer ring 1402. Cap base 202 is shown between assembly unit 1702 and inner bezel 1408. Ends 1602, 1604 create a space in inner bezel 1408 so that face 2002 is coded for outer ring 1402.

Figure 22:
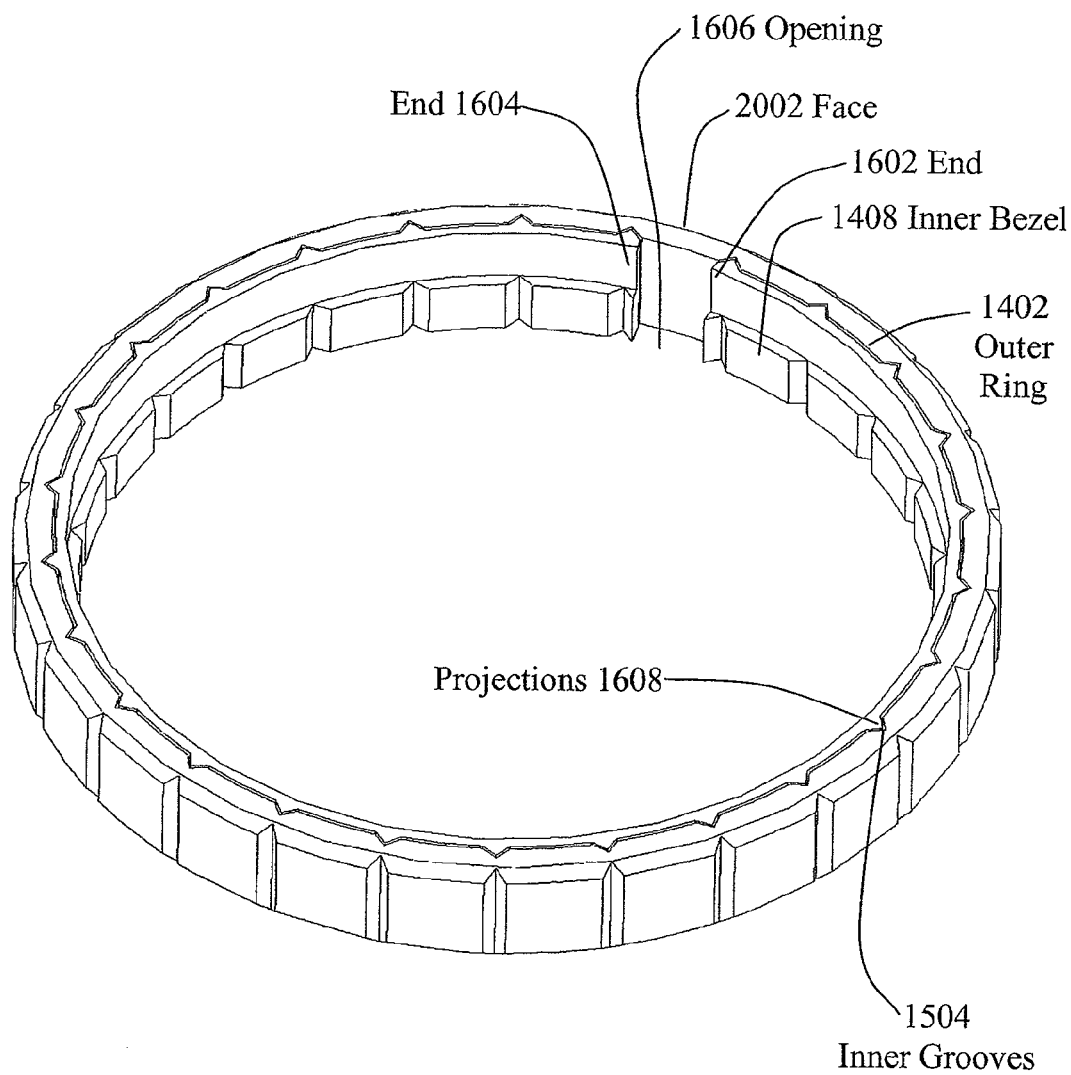
FIG. 22 is an isometric view of the inner bezel and outer ring.

FIG. 22 is an isometric view of inner bezel 1408 being interlocked with outer ring 1402 by projection 1608 of inner bezel 1408 interlocking with inner groove 1504 of outer ring 1402. Ends 1602, 1604 of inner bezel 1408 are interlocked with outer ring 1402 so that opening 1606 is formed. Opening 1606 sets the letter on the face 2002 of outer ring 1402 as the combination code for outer ring 1402.

Figure 23:
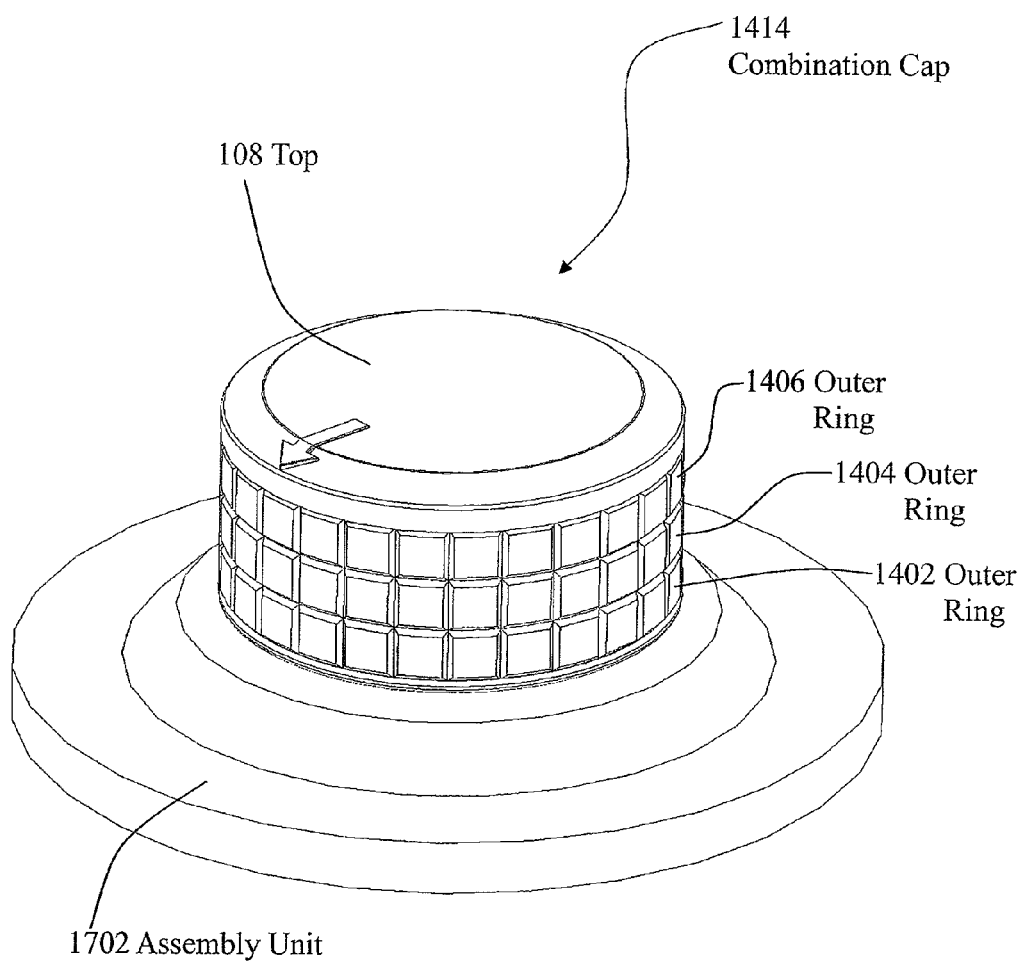
FIG. 23 is an isometric view of combination cap on the assembly base.

FIG. 23 is an isometric view of combination cap 1414 in an assembled position on assembly unit 1702. Top 108 is employed so that outer rings 1402, 1404, 1406 are secured and assembled.

Figure 24:
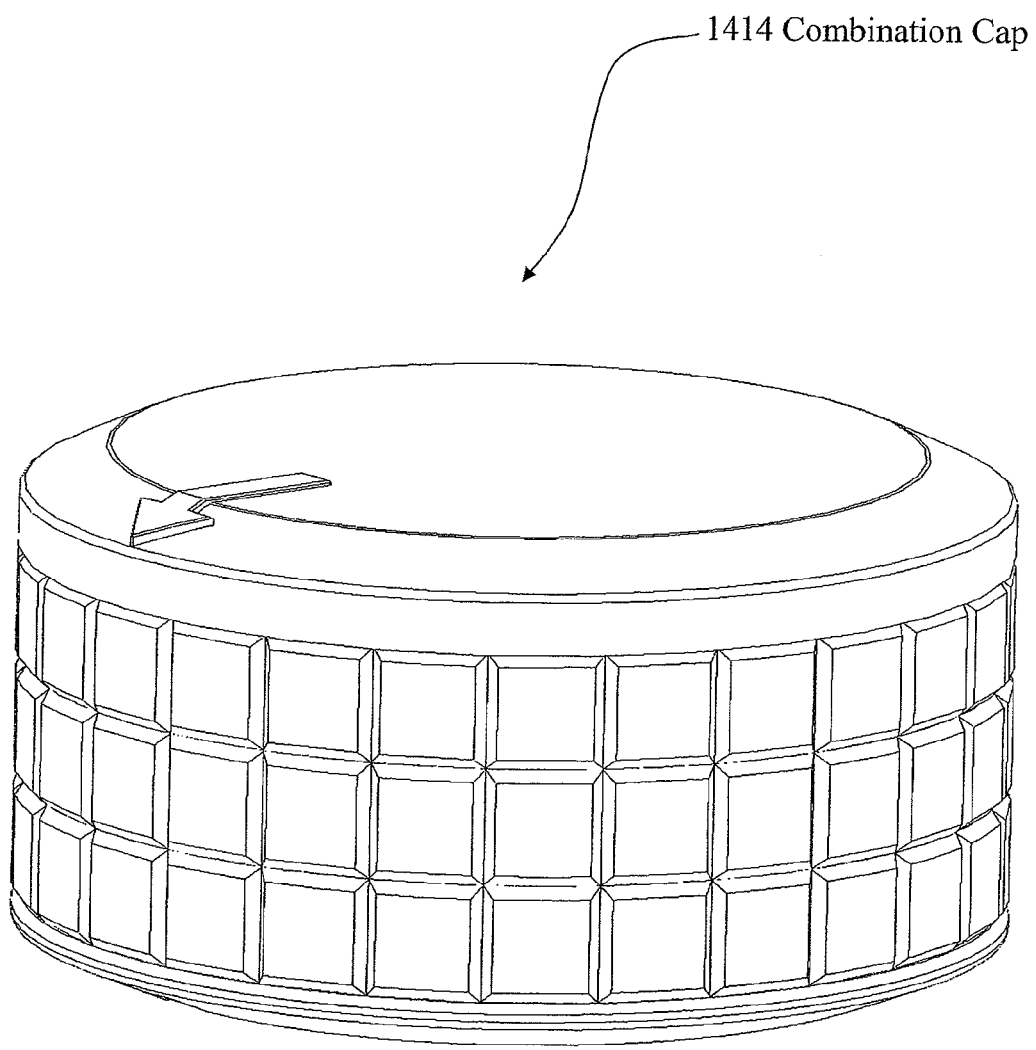
FIG. 24 is an isometric view of the combination cap of FIG. 23.

FIG. 24 is an isometric view of combination cap 1044 shown in an assembled position without assembly unit 1702 employed. In other words, combination cap 1044 is coded and ready to be employed on canister 104 from FIG. 14.

Figure 25:
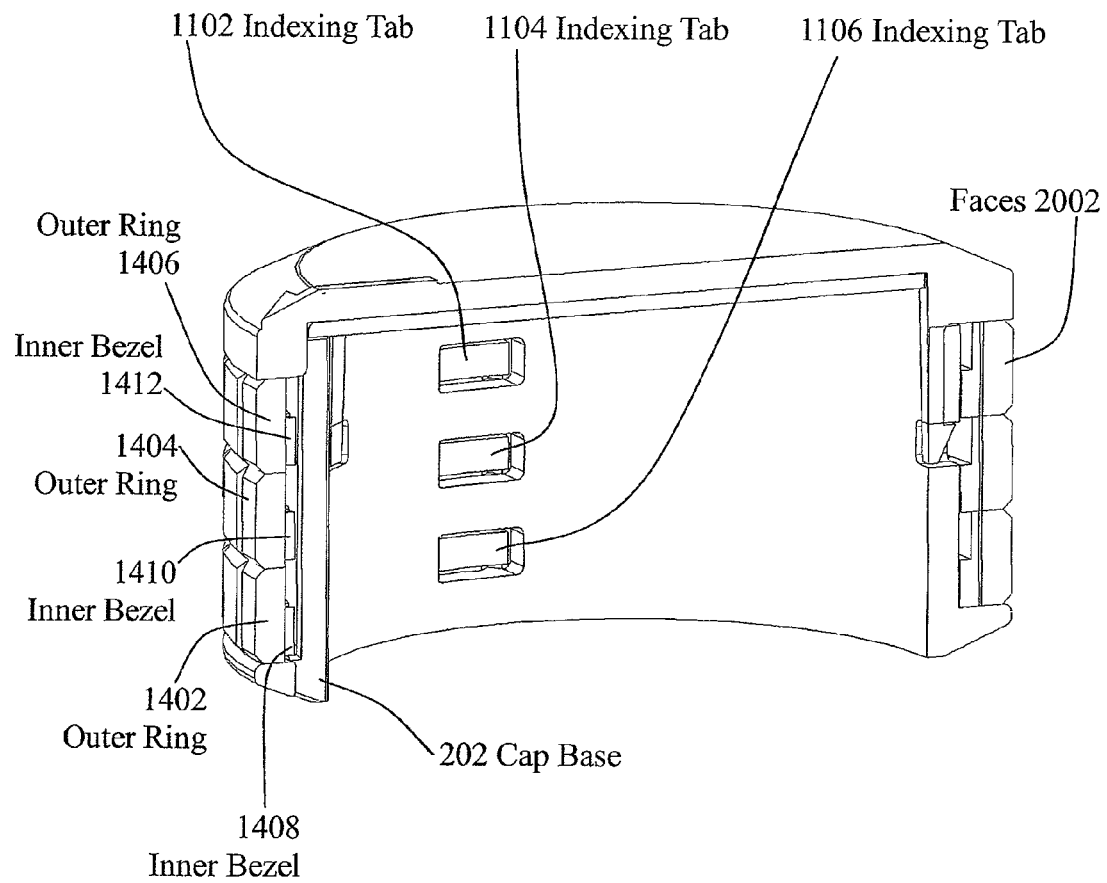
FIG. 25 is an isometric cross sectional view of FIG. 24.

FIG. 25 is a cross sectional isometric view of FIG. 24. Indexing tabs 1102, 1104, 1106 are located on cap base 202. Indexing tabs 1102, 1104, 1106 help facilitate the indexing of faces 2002 located on outer rings 1406, 1404, 1402 so that outer rings are able to rotate in a manner and some resistance created by indexing tabs 1102, 1104, 1106. Indexing tabs 1102, 1104, 1106 are tabs that are flexible in nature and have a lip that interacts with inner bezels 1412, 1410, 1408 so that outer rings 1406, 1404, 1402 do not rotate in a spinning manner. However, outer rings 1406, 1404, 1402 will rotate with some resistance in order to retain the proper location of faces 2002.

Figure 26:
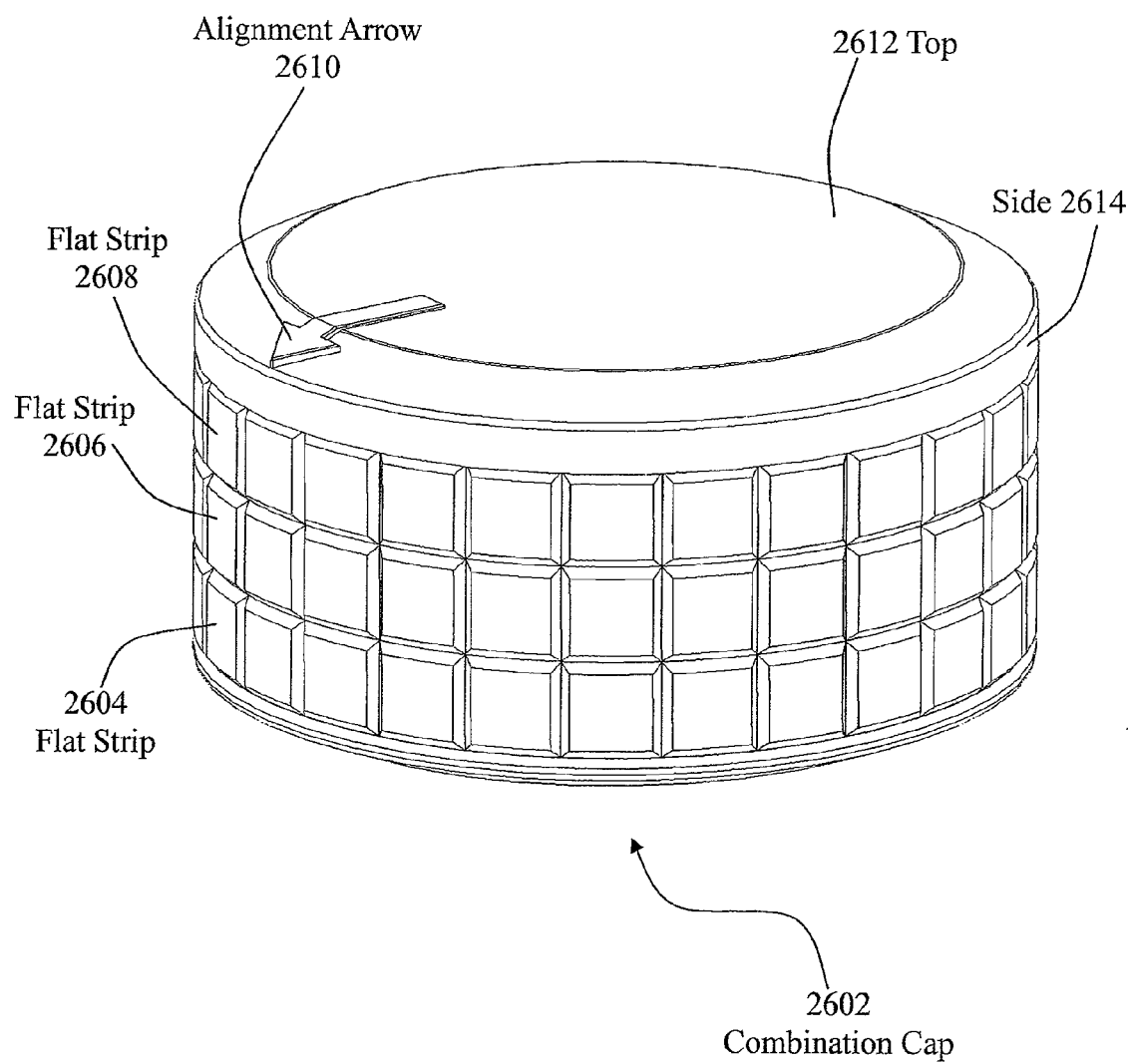
FIG. 26 is another embodiment of a combination cap.

FIG. 26 is an isometric view of another embodiment of combination cap 2602. Flat strips 2604, 2606, 2608 are attached to side 2614. Top 2612 has alignment arrow 2610 that can be used to be aligned with the alignment arrow 110 on canister 104 (FIG. 1). Combination cap 2602 can be created by having top 2612 and side 2614 in a uniform piece so that flat strips 2604, 2606, 2608 can be attached to combination cap 2602 either by a mushroom button in hole, ultrasonically fusing or gluing or any other mechanical means known in the art. Creating flat strips 2604, 2606, 2608 and then attaching them forms a solid ring structure. Coding a combination can be done by removing a tab of one of each of an internal tab of flat strip 2604, 2606, 2608 from the letter the user wishes to encode so that combination cap 2602 locks and engages on the projections 218, 216, 214 located on canister 104, as shown in FIG. 2. There are benefits of using strips in the manufacturing process because the strips are cheaper and easier to manufacture. In addition, strips allow a cap to be made of a single, solid piece rather than a cap base and a cap top that snap together to form a cap structure. This obviously reduces the number of parts needed to manufacture the combination cap to a single cap base and three flat strips 2604, 2606, 2608, which is a simpler and more cost effective design.

Figure 27:
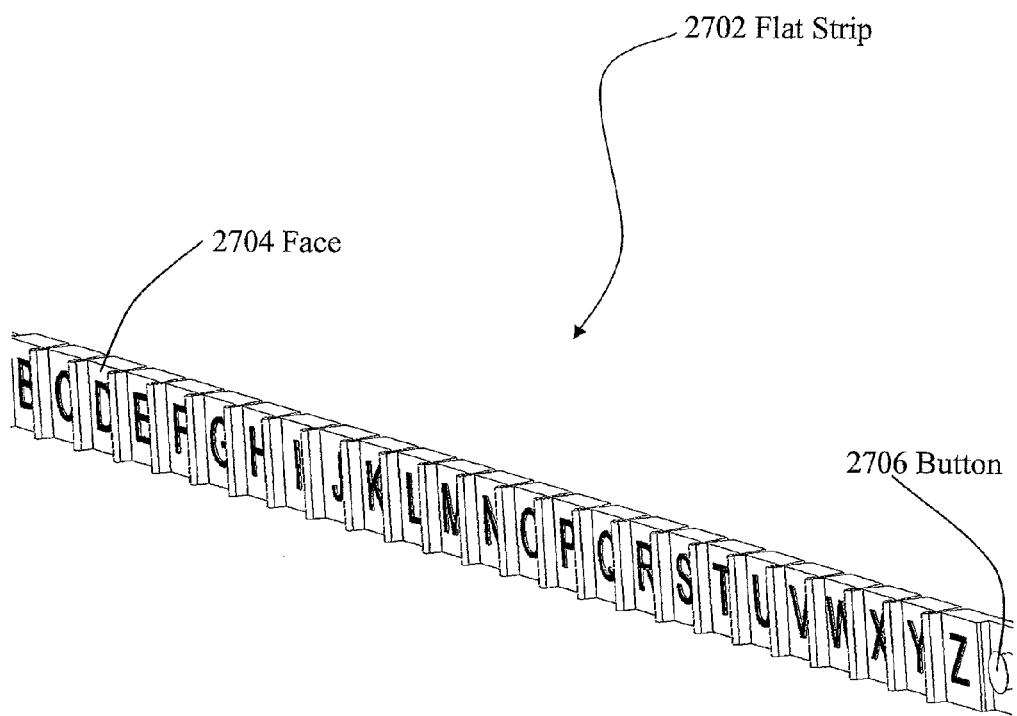
FIG. 27 is an isometric view of a flat strip.

FIG. 27 is an isometric view of flat strip 2702 that can be employed on combination cap 2602 of FIG. 26. Flat strip 2702 has face 2704, which may have letters, numbers, symbols, colors, projections or any other identifying element. Flat strip 2702 also has button 2706, which is used to lock into a recess on the opposite side to form a ring.

Figure 28:
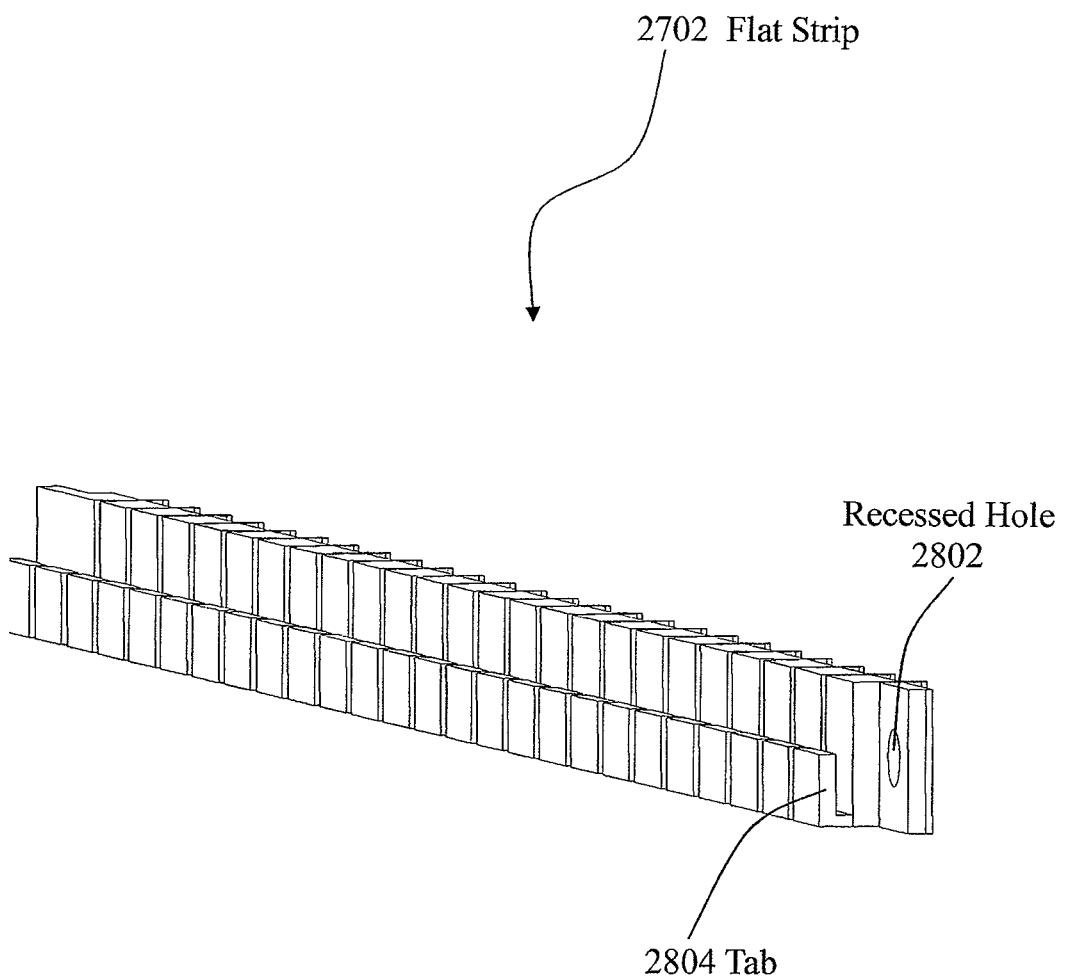
FIG. 28 is an isometric rear view of FIG. 27.

FIG. 28 is an isometric view of an opposite side of FIG. 27 showing flat strip 2702. FIG. 28 shows tabs 2804, which can be broken away to code the combination letters for a lock. Recessed hole 2802 is used to engage with and lock with button 2706 from FIG. 27 so that flat strip 2702 forms a ring around combination cap 2602 as shown in FIG. 26. Flat strip 2702 shown in FIGS. 27 and 28 can be molded easily in a single line and can be embossed, printed and formed easily into a flat strip. Button 2706 (FIG. 27) and recessed hole 2802 (FIG. 28) can be hooked together and ultrasonically welded when flat strip 2702 is mounted on combination cap 2602, so that top 2612 is a single piece. Flat strip 2702 can be formed into a ring by many different means and is not limited to button 2706 and recessed hole 2802.

Alternatively, flat strip 2702 can be formed into a ring and ultrasonically welded so a series of rings are formed, so the rings can then be mounted on the cap base 202 and the top 2612 can be ultrasonically welded to cap base 202, so combination cap 2602 is ready to be coded by a pharmacist or user.

Figure 29:
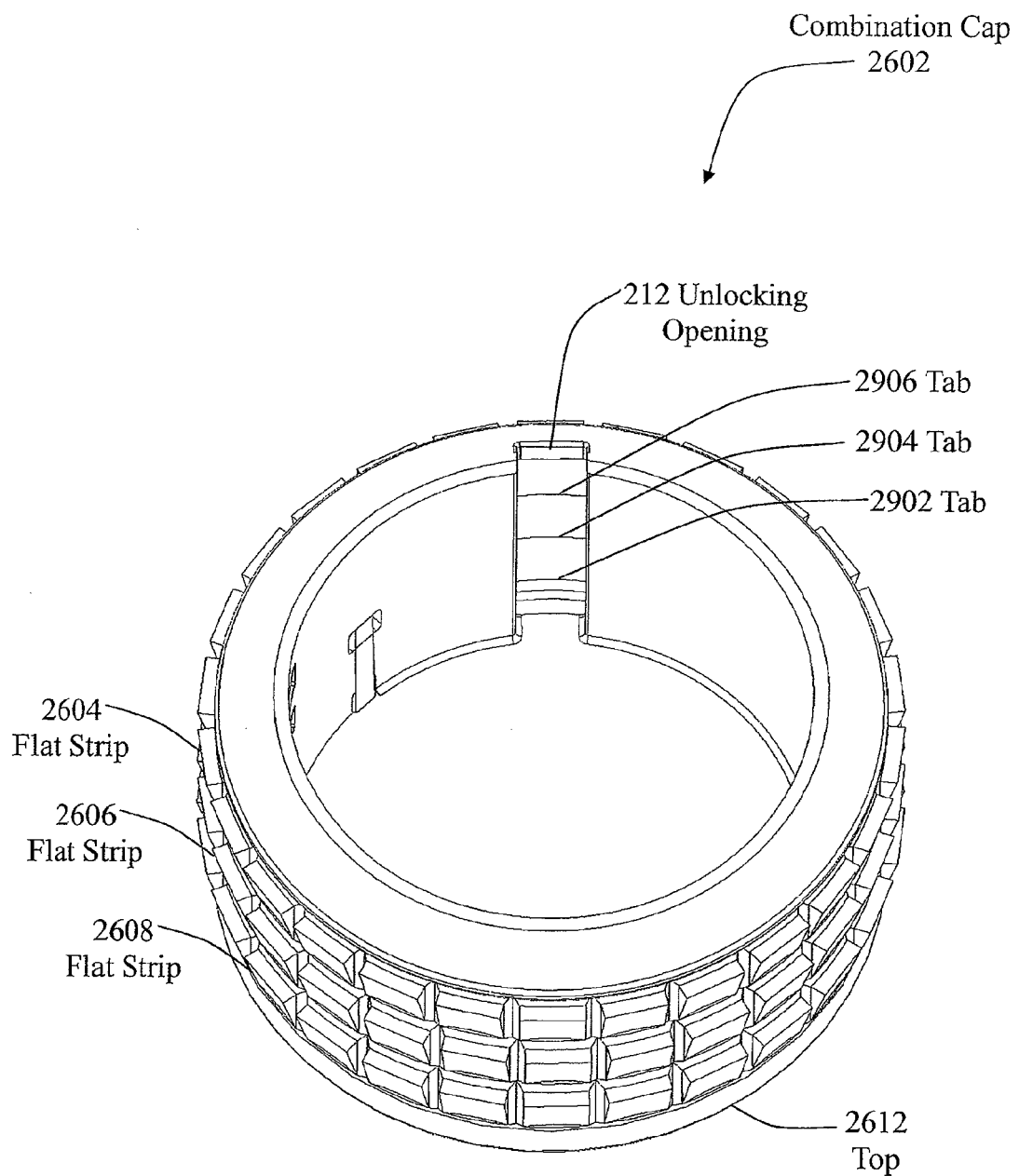
FIG. 29 is an isometric internal view of the cap from FIG. 1 and FIG. 26.

FIG. 29 is an isometric view of the inside of cap 106 from FIG. 1 and combination cap 2602 from FIG. 26. Although FIG. 1 and FIG. 26 are different embodiments, the internal views are the same, showing unlocking opening 212 so that tabs 2902, 2904, 2906 can be removed and a code is set. The rings 114, 116, 118 (FIG. 1) or flat strips 2604, 2606, 2608 may be rotated so that the desired tabs 2902, 2904, 2906 to set to a desired combination may be exposed in unlocking opening 212. Tabs 2902, 2904, 2906 may be removed in a rapid fashion by a mechanism that has a lever, or may be removed by other mechanical means known in the art, such as a hook or blade that can remove tabs 2902, 2904, 2906 in one easy, rapid motion so that the pharmacist or user does not consume a lot of time setting the combination code. In this manner, a pharmacist or user may obtain the cap 106, or combination cap 2602, in an assembled form and the combination code can be easily set by the user or pharmacist in a rapid manner.

Figure 30:
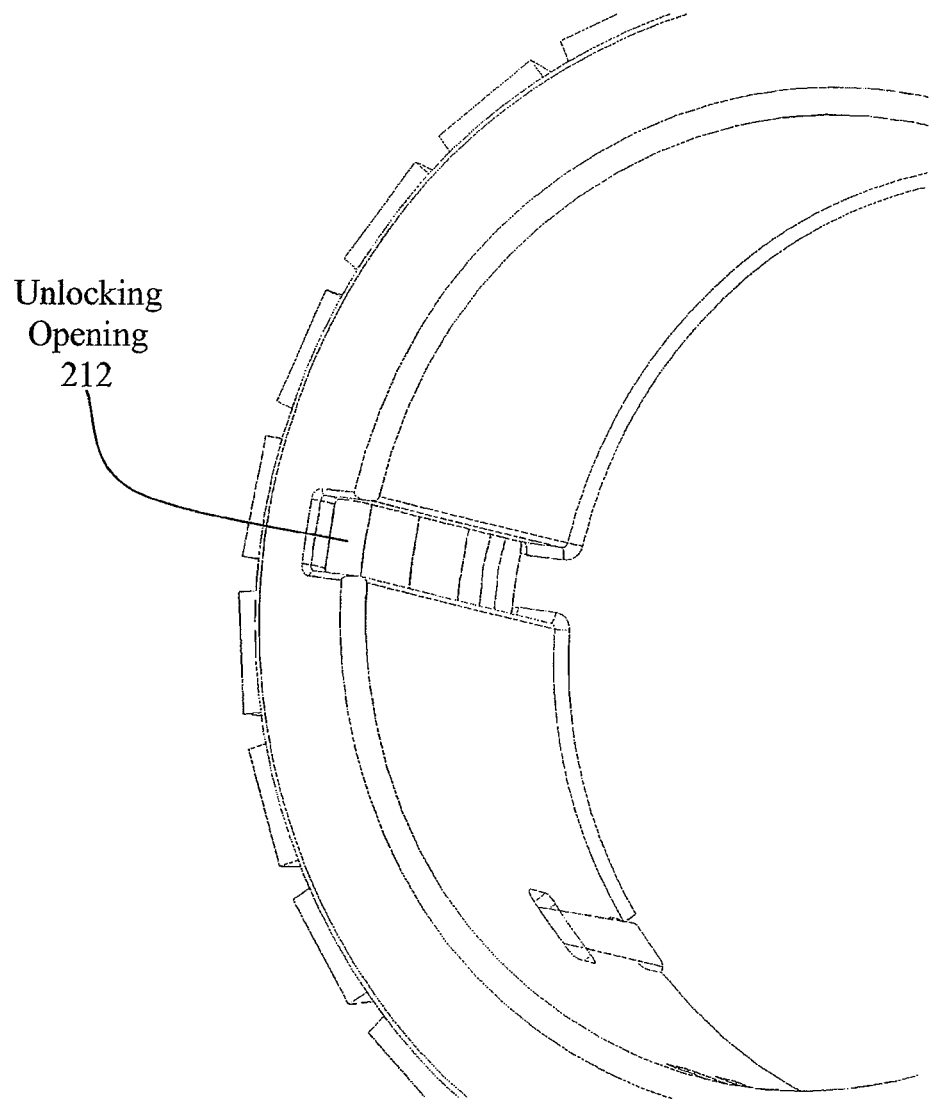
FIG. 30 is an isometric internal view of the cap from FIG. 1 and FIG. 26.

FIG. 30 is an isometric view of cap 106 and combination cap 2602 from FIG. 29. However, tabs 2902, 2904, 2906 from FIG. 29 have been removed so that unlocking opening is set to the correct code. Unlocking opening can then freely slide from canister 104 (FIG. 1). In other words, the combination has been set from the removal of tabs 2902, 2904, 2906 from unlocking opening 212.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A container having a programmable combination locking cap comprising:
   a canister adapted to hold contents, said canister having a canister alignment arrow;
   at least three rings having identifying elements on a front surface of a front portion of said at least three rings and ring tabs on a back portion of said at least three rings that can be removed to provide tab openings that set a combination code;
   a cap base on which said at least three rings are adjacently aligned;
   at least three canister tabs located on said canister that interlock with said ring tabs to prevent removal of said combination locking cap;
   a top, having a cap base alignment arrow, that secures said at least three rings to said cap base;
   an unlocking opening disposed in said cap base so that when said tab openings are aligned with said cap base alignment arrow and said canister alignment arrow, said locking cap may be freely removed from said canister.

2. The container of claim 1 further comprising:
   at least three indexing tabs, located on said cap base that create resistance between said at least three rings and said cap base, that impede movement of said at least three rings while removing said locking cap from said canister.

3. The container of claim 2 further comprising:
   a blocking tab located on said canister that blocks a view of the said tab openings.

4. The container of claim 3 wherein said at least three rings each have a slanted front surface and identifying elements that are molded onto said slanted front surface.

5. The container of claim 3 wherein said at least three rings comprise flat strips with said identifying elements printed on a front surface of said at least three rings, said flat strips being secured to said cap base.

6. A container having a programmable combination locking cap comprising:
   a canister adapted to hold contents, said canister having a canister alignment arrow;
   at least three outer rings having inner grooves on an interior surface and identifying elements on a front surface;
   at least three bezels having projections on an outer surface that engage said inner grooves of said at least three outer rings in a manner that allows said identifying elements on said front surface of said at least three outer rings to be oriented with respect to said at least three bezels to create a desired combination, each bezel of said at least three bezels having a first end and a second end, said first end and said second end forming a bezel slot;
   an assembly base having an assembly base projection;
   a cap base having an unlocking slot that is aligned with and engages said assembly base projection to allow said cap base to slide over and be assembled with said assembly base and allow said at least three bezels to be placed over said cap base with said bezel slot at each of said at least three bezels aligned with said assembly base projection;
   a top, said top having a cap base alignment arrow, that secures said at least three outer rings and said at least three bezels to said cap base;
   at least three canister tabs located on said canister that are aligned with said canister alignment arrow that prevent said locking cap from being removed from said canister unless said bezel slot of each bezel of said at least three bezels is aligned with said at least three canister tabs on said canister and said canister alignment arrow is aligned with said cap base alignment arrow on said top so that said locking cap may be removed.

7. The container of claim 6 further comprising:
   at least three indexing tabs located on said cap base that create resistance to impede movement of said at least three bezels and said at least three outer.

8. The container of claim 7 further comprising:
   a blocking tab located on said canister that blocks a view of said combination.

9. A method of programming a locking cap for a container comprising:
   providing a canister having a canister alignment arrow, said canister adapted to hold contents;
   providing at least three rings having identifying elements on a front surface of a front portion of said at least three rings and ring tabs disposed on a back portion of said at least three rings;
   removing selected ring tabs from said at least three rings to create tab openings that set a combination code;
   providing a cap base having a cap base opening;
   placing said at least three rings on a cap base so that said tab openings are aligned with said cap base opening;
   providing at least three canister tabs located on said canister;
   placing said cap base on said canister so that said cap base opening is aligned with said canister tabs;
   securing a top, having cap base alignment arrow, to said cap base so that said cap base alignment arrow is aligned in a predetermined orientation with respect to said cap base, so that said locking cap can be removed from said canister when said cap base alignment arrow is aligned with said canister alignment arrow and said at least three canister tabs are aligned with said tab openings.

10. The method of claim 9 further comprising:
    providing at least three indexing tabs located on said cap base that create resistance between said cap base and said at least three rings that impedes shifting of said at least three rings while removing said locking cap from said canister.

11. The method of claim 10 further comprising:
    providing a blocking tab located on said canister that blocks a view of the said tab openings that identify said combination.

12. The method of claim 11 wherein said at least three rings are formed to have a slanted shape and have said identifying elements molded onto said front surface.

13. The method of claim 9 wherein said at least three rings are formed with flat strips and said identifying elements are printed on said front surface.

14. A method of programming a locking cap for a container comprising:
    providing a canister having a canister alignment arrow, said canister adapted to hold contents;

providing at least three outer rings having inner grooves on an interior surface and identifying elements on a front surface of said at least three outer rings;

providing at least three bezels having bezel projections on an outer surface that are adapted to engage said inner grooves, each bezel of said at least three bezels having a first end and a second end so that said first end and said second end form a bezel slot;

providing an assembly base having an assembly base projection;

sliding a cap base, having a cap base unlocking slot, on top of said assembly base so that said projection of said assembly base is aligned with said unlocking slot;

coding a combination by aligning said at least three outer rings with said at least three bezels so that said inner grooves of said at least three outer rings interlocks with said projections of said at least three bezels so that said slot of said at least three bezels is aligned with a desired identifying element of said identifying elements on said at least three outer rings;

placing said at least three bezels that are assembled with said at least three outer rings around said cap base so that said bezel slot is aligned with said cap base unlocking slot;

securing a top to said cap base that secures said at least three outer rings and said at least three bezels to said cap base, said top having a cap base alignment arrow;

providing at least three canister tabs, located on said canister, that engage said at least three bezels and do not allow said locking cap from being removed from said canister unless said bezels are properly aligned with said at least three canister tabs and said canister alignment arrow is aligned with said cap base alignment arrow so that said locking cap may be removed.

15. The method of claim 14 further comprising:

providing a blocking tab located on said canister that blocks a view of said combination.

16. The method of claim 15 further comprising:

providing at least three indexing tabs located on said cap base that create resistance between said at least three bezels and said cap base so that said at least three outer rings will be impeded from shifting while said locking cap is being removed from said canister.

\* \* \* \* \*